(12) United States Patent
Amano

(10) Patent No.: US 10,809,506 B2
(45) Date of Patent: Oct. 20, 2020

(54) IMAGING OPTICAL SYSTEM, PROJECTION DISPLAY DEVICE, AND IMAGING APPARATUS

(71) Applicant: FUJIFILM Corporation, Tokyo (JP)

(72) Inventor: Masaru Amano, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/687,880

(22) Filed: Nov. 19, 2019

(65) Prior Publication Data
US 2020/0166737 A1 May 28, 2020

(30) Foreign Application Priority Data
Nov. 27, 2018 (JP) ................................. 2018-221615

(51) Int. Cl.
| G03B 21/28 | (2006.01) |
| G02B 17/08 | (2006.01) |
| G02B 17/00 | (2006.01) |
| G03B 17/14 | (2006.01) |
| G03B 17/17 | (2006.01) |
| G02B 7/04 | (2006.01) |

(52) U.S. Cl.
CPC ............. G02B 17/08 (2013.01); G02B 7/04 (2013.01); G02B 17/004 (2013.01); G03B 17/14 (2013.01); G03B 17/17 (2013.01); G03B 21/28 (2013.01)

(58) Field of Classification Search
CPC ...... G02B 17/08; G02B 17/004; G02B 17/14; G02B 17/17; G02B 7/04; G03B 21/28
USPC .......................................................... 353/99
See application file for complete search history.

(56) References Cited

U.S. PATENT DOCUMENTS

| 10,466,452 | B2 | 11/2019 | Minefuji | |
| 2004/0196545 | A1* | 10/2004 | Kurioka | G02B 17/0626 359/364 |
| 2010/0097582 | A1 | 4/2010 | Nagase et al. | |
| 2015/0293434 | A1* | 10/2015 | Matsuo | G02B 13/16 353/101 |
| 2020/0142291 | A1* | 5/2020 | Nishikawa | G02B 13/16 |

FOREIGN PATENT DOCUMENTS

| JP | 02000199852 A | * | 7/2000 | ......... G03F 7/70233 |
| JP | 2008-250296 A | | 10/2008 | |
| JP | 2017-040849 A | | 2/2017 | |

OTHER PUBLICATIONS

Machine Translation of JP02000199852A (Year: 2020).*

* cited by examiner

*Primary Examiner* — Jerry L Brooks
(74) *Attorney, Agent, or Firm* — Studebaker & Brackett PC

(57) ABSTRACT

The imaging optical system consists of, in order from a magnification side: a catoptric system; and a dioptric system that includes a plurality of lenses. The dioptric system forms a first intermediate image between the dioptric system and the catoptric system on an optical path and at a position conjugate to a reduction side imaging surface, and the catoptric system re-forms the first intermediate image on a magnification side imaging surface. The catoptric system consists of a first reflective surface, a second reflective surface, and a third reflective surface in order along the optical path from the magnification side. The first reflective surface and the third reflective surface are formed on one member and have the same surface shapes.

11 Claims, 22 Drawing Sheets

EXAMPLE 1

EXAMPLE 1

EXAMPLE 2

EXAMPLE 3

EXAMPLE 4

EXAMPLE 4A

EXAMPLE 4 MODIFICATION EXAMPLE 1

EXAMPLE 4 MODIFICATION EXAMPLE 2

EXAMPLE 4 MODIFICATION EXAMPLE 2A

EXAMPLE 4 MODIFICATION EXAMPLE 3

EXAMPLE 4 MODIFICATION EXAMPLE 4

EXAMPLE 1

EXAMPLE 2

DISTANCE: 580

4    5    6

1    2    3

7    8    9

30 μm

DISTANCE: 465.7

4  5  6

1  2  3

7  8  9

30 μm

DISTANCE: 768.7

4            5            6

1            2            3

7            8            9

30 μm

EXAMPLE 4

IMAGING OPTICAL SYSTEM, PROJECTION DISPLAY DEVICE, AND IMAGING APPARATUS

CROSS-REFERENCE TO RELATED APPLICATIONS

The present application claims priority under 35 U.S.C. § 119 to Japanese Patent Application No. 2018-221615, filed on Nov. 27, 2018. The above application is hereby expressly incorporated by reference, in its entirety, into the present application.

BACKGROUND OF THE INVENTION

1. Field of the Invention

The present disclosure relates to an imaging optical system, a projection display device, and an imaging apparatus.

2. Description of the Related Art

In recent years, projection display devices, each of which is equipped with a light valve including a liquid crystal display element, a digital micromirror device (DMD: registered trademark) display element, and the like, have come into widespread use, and performance thereof has increased. In particular, as the resolution of the light valve has been improved, a high demand has also been made for the resolution performance of the projection optical system.

In addition, there has been an increase in the demand to mount a highly versatile projection optical system on a projection display device. The projection optical system has a higher performance and a wider angle while having a small size in consideration of an increase in degree of freedom in setting the distance to the screen and installability in the indoor space.

In order to meet such demands, an imaging optical system, in which a dioptric system forms an intermediate image at a position conjugate to the reduction side imaging surface and a catoptric system re-forms the intermediate image on the magnification side imaging surface, has been proposed (for example, JP2008-250296A and JP2017-040849A).

SUMMARY OF THE INVENTION

The imaging optical system of JP2008-250296A is an optical system using a dioptric system and one aspheric reflective surface as a catoptric system. However, in the imaging optical system, one aspheric reflective surface re-forms an intermediate image. Therefore, in order to achieve wide angle, it is necessary to make the reflective surface larger. Further, in the imaging optical system of JP2008-250296A, in order to reduce the size of the reflective surface, the load on the dioptric system increases and the number of lenses increases. That is, the imaging optical system of JP2008-250296A has a problem that reduction in size is difficult.

The imaging optical system of JP2017-040849A is an optical system that uses a dioptric system and three aspheric reflective surfaces as a catoptric system, and achieves reduction in the number of lenses by reducing the burden of the amount of correction for aberrations of the dioptric system. However, the imaging optical system of JP2017-040849A has a problem in that it is difficult to reduce the size since the reflective surface on the magnification side is the largest.

The imaging optical system of JP2017-040849A is configured such that the three reflective surfaces in the catoptric system are each composed of separate members. Therefore, in addition to an increase in the number of components, it is difficult to align the three reflective surfaces, and there is room for improvement in manufacturability.

The present disclosure has been made in consideration of the above-mentioned situations, and it is an object of the present disclosure to provide an imaging optical system which forms an intermediate image, a projection display device comprising the imaging optical system, and an imaging apparatus comprising the imaging optical system. The imaging optical system has a small size, a wide angle, and a small number of components, is excellent in manufacturability, and favorable optical performance as compared with that in the related art.

The specific means for achieving the object includes the following aspects.

According to the present disclosure, there is provided an imaging optical system consisting of, in order from a magnification side: a catoptric system; and a dioptric system that includes a plurality of lenses. The dioptric system forms a first intermediate image between the dioptric system and the catoptric system on an optical path and at a position conjugate to a reduction side imaging surface, and the catoptric system re-forms the first intermediate image on a magnification side imaging surface. The catoptric system consists of a first reflective surface, a second reflective surface, and a third reflective surface in order along the optical path from the magnification side. The first reflective surface and the third reflective surface are formed on one member and have same surface shapes.

It is preferable that the first reflective surface and the third reflective surface are same aspheric surfaces or same free-form surfaces.

It is preferable that the first reflective surface and the third reflective surface have concave surface shapes.

It is preferable that a second intermediate image is formed between the first reflective surface and the second reflective surface on the optical path and at a position conjugate to the first intermediate image.

It is preferable that principal rays, which have a maximum angle of view and travel from the first reflective surface toward the magnification side, intersect twice with principal rays, which have the maximum angle of view, in the catoptric system.

It is preferable that the second reflective surface has a convex surface shape.

It is preferable that all optical surfaces of the dioptric system are formed as rotationally symmetric surfaces which are rotationally symmetric with respect to an optical axis of the dioptric system as a center.

It is preferable that at least one of the first reflective surface, the second reflective surface, or the third reflective surface and a part of the dioptric system move during focusing.

It is preferable that a reflective surface closest to the dioptric system among the first reflective surface, the second reflective surface, and the third reflective surface and a part of the dioptric system move during focusing.

According to the present disclosure, there is provided a projection display device comprising: a light valve that outputs an optical image based on image data; and the imaging optical system of the present disclosure. The imaging optical system projects the optical image, which is output from the light valve, on a screen.

An imaging apparatus of the present disclosure comprises the imaging optical system of the present disclosure.

It should be noted that the above-mentioned "catoptric system" means an optical system that may include not only a reflective surface but also optical elements, such as a stop, a filter, and a cover glass, other than lenses.

The above-mentioned "dioptric system" means an optical system that may include a lens which does not have a refractive power substantially, and optical elements, such as a stop, a filter, a cover glass, a mirror, and a prism, other than lenses.

In the present specification, the terms "consisting of ~" and "consists of ~" means that each of the catoptric system and the dioptric system may include not only the above-mentioned elements but also members including mechanism parts such as a lens flange, a lens barrel, an imaging element, a focusing mechanism, and a camera shake correction mechanism.

The surface shape relating to the aspheric surface is considered in the paraxial region unless otherwise specified. The "d line", "C line", and "F line" described in the present specification are emission lines. The wavelength of the d line is 587.56 nm (nanometers) and the wavelength of the C line is 656.27 nm (nanometers), and the wavelength of F line is 486.13 nm (nanometers).

According to the present disclosure, it is possible to provide an imaging optical system which forms an intermediate image, a projection display device comprising the imaging optical system, and an imaging apparatus comprising the imaging optical system. The imaging optical system has a small size, a wide angle, and a small number of components, is excellent in manufacturability, and favorable optical performance.

DESCRIPTION OF THE PREFERRED EMBODIMENTS

Figure 1:
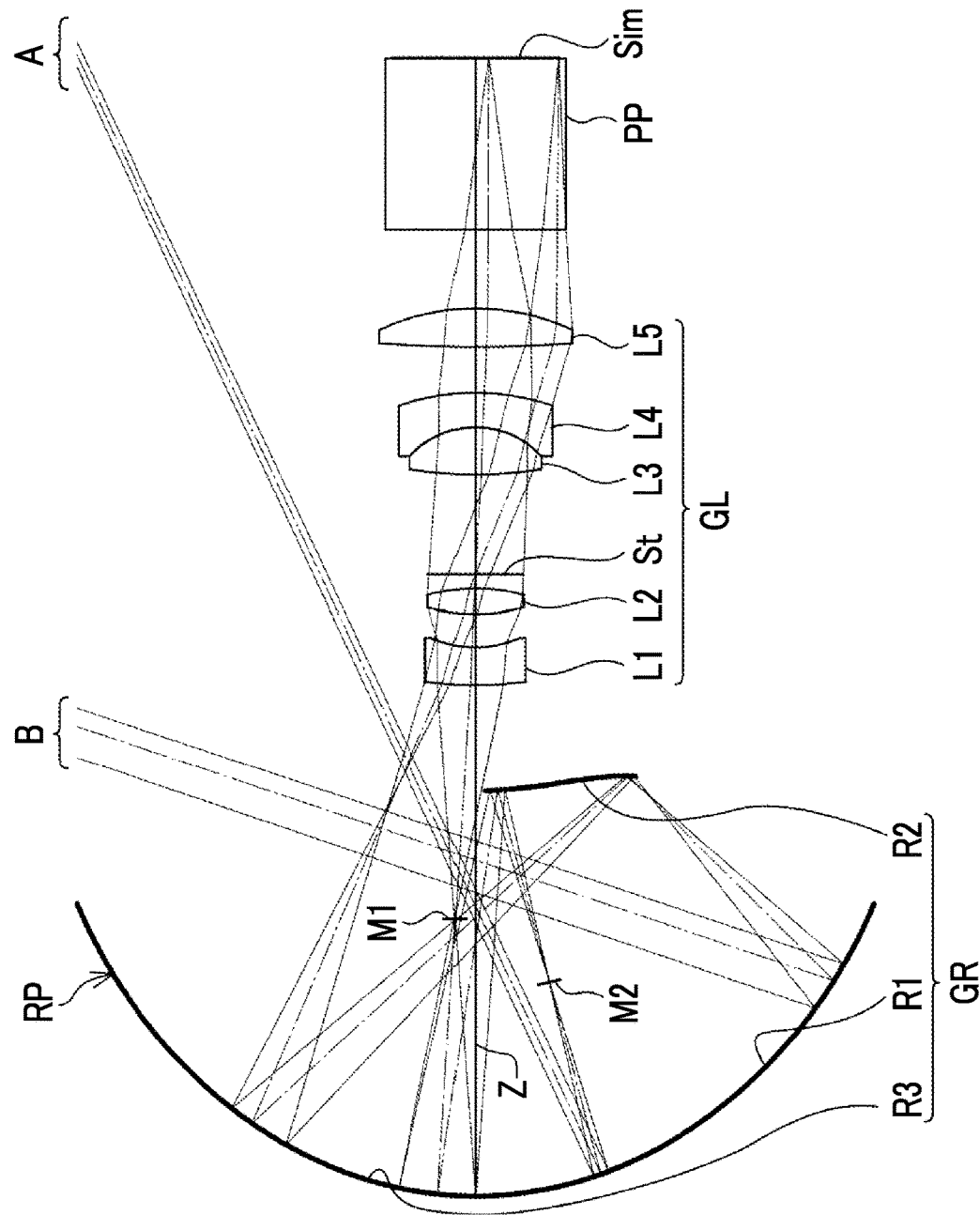
FIG. 1 is a cross-sectional view showing a configuration of an imaging optical system (common to Example 1) according to an embodiment of the present disclosure.

Hereinafter, embodiments of the technology of the present disclosure will be described in detail with reference to the drawings. FIG. 1 is a cross-sectional view showing a configuration of an imaging optical system according to an embodiment. The exemplary configuration shown in FIG. 1 is the same as the configuration of the imaging optical system of Example 1 to be described later. In FIG. 1, description is given under the assumption that the left side is the magnification side and the right side is the reduction side. Further, the aperture stop St shown in the drawing does not necessarily indicate its sizes or shapes, and indicates a position of the aperture stop St on the optical axis Z. In addition, rays A with the minimum angle of view and rays B with the maximum angle of view are written together as the rays.

This imaging optical system is, for example, mounted on a projection display device, and can be used to project an optical image, which is output from the light valve, onto the screen (magnification side imaging surface). The light valve outputs the optical image on the basis of the image data and has an image display element on which an image display surface Sim is formed. In FIG. 1, assuming that the imaging optical system is mounted on a projection display device, an optical member PP such as a filter or a prism used in a color synthesizing section or an illumination light separating section, and the image display surface (reduction side imaging surface) Sim of a light valve are also shown. In the projection display device, rays including image information output from the image display surface Sim are incident on the imaging optical system through the optical member PP, and are projected onto a screen (for example, refer to the reference numeral 105 in FIG. 18) through the imaging optical system.

As shown in FIG. 1, the imaging optical system of the present embodiment consists of a catoptric system GR and a dioptric system GL, which includes a plurality of lenses, in order from the magnification side. The dioptric system GL forms a first intermediate image M1 between the dioptric system GL and the catoptric system GR on the optical path and at a position conjugate to the reduction side imaging surface. The catoptric system GR is configured to re-form the first intermediate image M1 on the magnification side imaging surface.

As described above, in the imaging optical system that forms the first intermediate image M1, the size of each reflective surface in the catoptric system GR can be reduced, and the focal length of the whole system can be shortened. Thus, this configuration can be made appropriate for widening the angle. The reason for this is that, in a case where the imaging optical system is mounted on the projection side display device, it is necessary to lengthen the back focal length in order to ensure a space in which the optical member PP such as a prism is disposed. In general, an optical system having a long back focal length tends to have a long focal length of the whole system. However, by adopting a configuration in which the first intermediate image M1 is formed, it is possible to shorten the back focal length of the optical system closer to the magnification side than the first intermediate image M1. Thus, it becomes easy to shorten the focal length of the optical system closer to the magnification side than the first intermediate image M1. Thereby, the focal length of the whole system can be shortened as compared with the case where the first intermediate image M1 is not formed. Here, the wide angle refers to a case where the total angle of view is equal to or greater than 130°.

The catoptric system GR consists of a first reflective surface R1, a second reflective surface R2, and a third reflective surface R3 in order along the optical path from the magnification side.

In such a manner, by reflecting light multiple times by three reflective surfaces to increase the substantial optical path length, it is possible to reduce the power per surface of each reflective surface while achieving reduction in size. In a case where the power per surface of the reflective surface is minimized, the amount of aberration generated is also reduced. As a result, the burden of the amount of correction for aberrations of the dioptric system GL is reduced, and the number of lenses of the dioptric system GL can be reduced. Therefore, the entire imaging optical system can be reduced in size.

Further, by providing three reflective surfaces free from occurrence of chromatic aberration, it becomes possible to reduce occurrence of chromatic aberration in the entire optical system.

The first reflective surface R1 and the third reflective surface R3 are formed on one member RP and have the same surface shapes. This configuration has the following advantages. First, by forming a plurality of reflective surfaces on one member RP, the number of components is reduced compared to the case where each reflective surface is formed on a separate member.

Secondly, the operation of relative alignment of the first reflective surface R1 and the third reflective surface R3 at the time of assembly becomes unnecessary. The relative positional relationship between the three reflective surfaces of the first reflective surface R1 to the third reflective surface R3 affects optical performance (mainly, aberrations such as distortion and field curvature). Thus, high accuracy is required for the accuracy of alignment between the three reflective surfaces. In a case where each reflective surface is formed on a separate member, it is necessary to perform an operation of alignment between the three reflective surfaces at the time of assembly. However, the operation of alignment performed at the time of assembly takes time and effort. In the catoptric system GR of the present embodiment, the first reflective surface R1 and the third reflective surface R3 are formed on one member RP. Thus, the operation of alignment between two reflective surfaces of the first reflective surface R1 and the third reflective surface R3 among the three reflective surfaces at the time of assembly becomes unnecessary. Therefore, according to the imaging optical system of the present embodiment, as compared with the case where the operation of alignment between the three reflective surfaces is performed, it is possible to improve manufacturability while maintaining favorable optical performance. Third, since the first reflective surface R1 and the third reflective surface R3 have the same surface shapes, the manufacturability is further favorable.

In the present embodiment, the first reflective surface R1 and the third reflective surface R3 are the same aspheric surfaces or the same free-form surfaces. Here, the same aspheric surface or the same free-form surface means that the expression and coefficient defining the aspheric surface or the free-form surface are the same. By forming the first reflective surface R1 and the third reflective surface R3 as the same aspheric surfaces or the same free-form surfaces, as compared with different cases, there are advantages in manufacture in that, for example, there are many common parts of parameters which are set in the processing apparatus for processing the member RP.

In the present embodiment, the first reflective surface R1 and the third reflective surface R3 have concave surface shapes. By forming the first reflective surface R1 closest to the magnification side as a concave surface having a convergence effect, the first reflective surface R1 can be reduced in size as compared with a case in which rays diverge. In addition, by forming the first reflective surface R1 and the third reflective surface R3 as concave surfaces, it is possible to reduce the size of an optical window (refer to an optical window 2 shown in FIG. 5) for emitting rays to the outside of the housing in a case where the imaging optical system is housed in the housing. Further, in a case where the size of the optical window is reduced, stray light incident into the housing from the outside can be reduced, and thus display quality can be improved.

In the imaging optical system of the present embodiment, it is preferable that a second intermediate image M2 is formed between the first reflective surface R1 and the second reflective surface R2 on the optical path and at a position conjugate to the first intermediate image M1. With such a configuration, since the focal length of the first reflective surface R1 can be shortened, reduction in size of the first reflective surface R1 can be achieved. Further, there is an advantage in achieving the wide angle.

By setting the position where the second intermediate image M2 is formed between the first reflective surface R1 and the second reflective surface R2, the following advantages are obtained. That is, in a case where an intermediate image is formed between the second reflective surface R2 and the third reflective surface R3, it is necessary to increase the distance between the third reflective surface R3 and the dioptric system GL in order to ensure the optical path length. As a result, the size of the third reflective surface R3 inevitably becomes large. The increase in size of the third reflective surface R3 is not preferable from the viewpoint of reducing the size of the entire imaging optical system. By forming the second intermediate image M2 between the first reflective surface R1 and the second reflective surface R2, the third reflective surface R3 and the entire imaging optical system can be reduced in size.

It is preferable that the principal rays having the maximum angle of view from the first reflective surface R1 toward the magnification side intersect twice with the principal rays having the maximum angle of view from the reduction side imaging surface to the magnification side imaging surface in the catoptric system GR. With such a configuration, it is possible to reduce the size of the entire catoptric system GR. Here, the term "in the catoptric system GR" means the inside of the optical path of the rays that are emitted from the dioptric system GL and then travel to the magnification side. In an optical system without an aperture stop, the principal rays are rays along the bisector of the maximum rays above the rays with the minimum angle of view and the maximum rays under the rays with the minimum angle of view.

It is preferable that the second reflective surface R2 has a convex surface shape. In a case where the first reflective surface R1 and the third reflective surface R3 are concave surface shapes, the second reflective surface R2 is formed in a convex surface shape. Thereby, the respective reflective surfaces of the catoptric system GR are arranged as concave, convex, and concave surfaces. Thereby, it is possible to achieve both wide angle and reduction in size while maintaining the power of the entire catoptric system GR appropriately.

It is preferable that all the optical surfaces of the dioptric system GL are formed as rotationally symmetric surfaces which are rotationally symmetric with respect to an optical axis of the dioptric system GL as a center. With such a configuration, the structure of the dioptric system GL can be simplified, and thus there is an advantage in achieving cost reduction.

It is preferable that at least one of the first reflective surface R1, the second reflective surface R2, and the third reflective surface R3 and a part of the dioptric system GL move during focusing. The reason for this is that a wide-angle optical system is characterized in the following point. The fluctuation in focal point with respect to the change in object distance is small due to a large depth of field near the optical axis, whereas in the periphery of the projected image, fluctuation in field curvature is large with respect to the change in object distance. Therefore, in addition to a part of the dioptric system GL, at least one reflective surface of the catoptric system GR is also moved, such that it is possible to suppress fluctuation in field curvature with respect to change in object distance. As a result, it is possible to maintain favorable performance.

In the present example, since the first reflective surface R1 and the third reflective surface R3 are formed on the member RP, either the member PR or the second reflective surface R2 is moved.

Here, the object distance is defined as a distance from the magnification side imaging surface (for example, a screen on which an optical image is projected) to the surface (for example, the first reflective surface R1 in FIG. 1) closest to the magnification side in the imaging optical system. The object distance corresponds to the projection distance.

It is preferable that a reflective surface R closest to the dioptric system GL among the first reflective surface R1, the second reflective surface R2, and the third reflective surface R3 and a part of the dioptric system GL move during focusing. By moving a part of the dioptric system GL and the reflective surface closest to the dioptric system GL, a mechanism for moving these members can be concentrically disposed. As a result, it is possible to facilitate design and manufacture. In the present example, the reflective surface closest to the dioptric system GL in terms of physical distance is the second reflective surface R2. Therefore, the second reflective surface R2 is moved.

Next, numerical examples of the imaging optical system of the present invention will be described.

Example 1

FIG. 1 is a cross-sectional view showing a configuration of the imaging optical system of Example 1.

The imaging optical system of Example 1 shown in FIG. 1 is composed of, in order along the optical path from the magnification side: a catoptric system GR consisting of three reflective surfaces including a first reflective surface R1, a second reflective surface R2, and a third reflective surface R3; and a dioptric system GL consisting of five lenses L1 to L5 and an aperture stop St. During focusing, the second reflective surface R2 and the lens L1 move independently of each other.

Table 1 shows basic lens data of the imaging optical system of Example 1, Table 2 shows data about specification, Table 3 shows data about variable surface distances, and Table 4 shows data about aspheric surface coefficients thereof. Hereinafter, meanings of the reference signs in the tables are, for example, as described in Example 1, and are basically the same as those in Examples 2 to 4.

The column of Si in the lens data shown in Table 1 shows i-th surface number. The i-th surface number is attached to each of surfaces of optical elements, where i sequentially increases toward the reduction side in a case where a magnification side surface of an optical element closest to the magnification side is regarded as a first surface. The column of the paraxial radius of curvature Ri shows a value (mm (millimeter)) of the paraxial radius of curvature of the i-th surface from the magnification side. Likewise, the column of the surface distance Di shows a distance (mm (millimeter)) on the optical axis Z between the i-th surface Si and an (i+1)th surface Si+1 from the magnification side. The column of Ndj shows a value of a refractive index of the j-th optical element from the magnification side at the d line (a wavelength of 587.6 nm (nanometers)). The column of vdj shows a value of an Abbe number of the j-th optical element from the magnification side at the d line. Further, the sign of the radius of curvature is positive in a case where a surface has a shape convex toward the magnification side, and is negative in a case where a surface has a shape convex toward the reduction side. Table 1 additionally shows the aperture stop St and the optical member PP, and in a place of a surface number of a surface corresponding to the aperture stop St, the surface number and a term of (St) are noted. Further, in the lens data of Table 1, in each place of the surface distance which is variable during focusing, DD[i] is noted. Numerical values each corresponding to the DD[i] are shown in Table 3.

The data about the specifications in Table 2 shows an absolute value |f| of the focal length of the whole system, a back focal length Bf of the whole system, an F number, and a total angle of view 2ω. It should be noted that, in this specification including Table 2 and the like, FNo. means an F number. It should be noted that the back focal length Bf is an air-converted value.

In the lens data of Table 1, the reference sign * is attached to surface numbers of aspheric surfaces, and radii of curvature of the aspheric surfaces are represented by numerical values of paraxial radii of curvature. The data about aspheric surface coefficients of Table 4 shows the surface numbers of the aspheric surfaces and aspheric surface coefficients of the aspheric surfaces. The "E±n" (n: an integer) in numerical values of the aspheric surface coefficients of Table 4 indicates "×10$^{±n}$". The aspheric surface coefficients are values of the coefficients KA and Am (m is an integer equal to or greater than 3, and is different for each surface) in aspheric surface expression represented as the following expression.

$$Zd = C \cdot h^2 / \{1 + (1 - KA \cdot C^2 \cdot h^2)^{1/2}\} + \Sigma Am \cdot h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is an inverse of paraxial radius of curvature, KA and Am are aspheric surface coefficients (m is an integer equal to or greater than 3, and is different for each surface), and Σ at the aspheric surface depth Zd means the sum with respect to m.

In the lens data and data about specification, "degree (°)" is used as a unit of angle, and "mm" (millimeter) is used as a unit of length, but appropriate different units may be used since the optical system can be used even in a case where the system is enlarged or reduced in proportion.

TABLE 1

Example 1·Lens Data

| Si | Ri | Di | Ndj | vdj |
|---|---|---|---|---|
| *1 | 53.9872 | DD[1] | Reflective surface | |
| *2 | 56.2357 | DD[2] | Reflective surface | |
| *3 | 53.9872 | DD[3] | Reflective surface | |
| *4 | 49.9185 | 5.7598 | 1.68948 | 31.02 |
| *5 | 15.5012 | DD[5] | | |
| 6 | 27.0474 | 3.8490 | 1.60562 | 43.71 |
| 7 | −27.2274 | 2.1206 | | |
| 8 (Stop) | ∞ | 15.2563 | | |
| 9 | 60.7265 | 7.1712 | 1.49700 | 81.61 |
| 10 | −13.2828 | 5.2650 | 1.80000 | 29.84 |
| 11 | −34.4251 | 6.9681 | | |
| 12 | 191.0862 | 5.8448 | 1.62041 | 60.29 |
| 13 | −33.5192 | 12.0000 | | |
| 14 | ∞ | 26.0500 | 1.51680 | 64.20 |
| 15 | ∞ | 0.2018 | | |

TABLE 2

Example 1·Specification (d line)

| | |
|---|---|
| \|f\| | 4.32 |
| Bf | 29.38 |
| FNo. | 2.42 |
| 2ω[°] | 142.4 |

TABLE 3

Example 1·Variable Surface Distance

| | Object distance | | |
|---|---|---|---|
| | 580 | 465.7 | 768.7 |
| DD[1] | 61.722 | 61.9333 | 61.5121 |
| DD[2] | −61.722 | −61.9333 | −61.5121 |
| DD[3] | 77.8314 | 77.8453 | 77.8172 |
| DD[5] | 5.0184 | 5.0044 | 5.0325 |

TABLE 4

Example 1·Aspheric Surface Coefficient

| Si | *1, *3 | *2 |
|---|---|---|
| KA | 4.064587731806E−01 | 4.588593388847E+00 |
| A3 | −5.793554312417E−06 | 1.387826329886E−05 |
| A4 | 1.119052635010E−06 | −1.657330865179E−05 |
| A5 | −9.131794404335E−08 | 7.644385502407E−07 |
| A6 | 3.928413809740E−09 | −1.158898366067E−07 |
| A7 | −4.862338573163E−11 | 1.167919711992E−08 |
| A8 | −1.853489933057E−12 | −4.301306512860E−10 |
| A9 | 6.320621987211E−14 | −3.140851347076E−11 |
| A10 | −4.448647087563E−17 | 3.004305215522E−12 |
| A11 | −2.039530617831E−17 | −1.605901356648E−14 |
| A12 | 1.727603440924E−19 | −4.878636417291E−15 |
| A13 | 2.687917378254E−21 | 9.512880942238E−17 |
| A14 | −3.547539012094E−23 | 2.731408388446E−18 |
| A15 | −1.190489190506E−25 | −6.446878783079E−20 |
| A16 | 2.269917198121E−27 | −2.585560664132E−22 |

| Si | *4 | *5 |
|---|---|---|
| KA | 1.000000000000E+00 | 1.000000000000E+00 |
| A4 | −1.219596474307E−05 | −3.705330434447E−05 |
| A6 | −1.123666572218E−07 | 1.599207418122E−07 |
| A8 | 9.457086944538E−09 | −2.706003588225E−09 |
| A10 | −2.666421874018E−10 | 1.052376551836E−11 |
| A12 | 3.382454813996E−12 | −1.846667885660E−13 |
| A14 | −1.703476935049E−14 | 3.576362417759E−16 |
| A16 | 0.000000000000E+00 | 0.000000000000E+00 |
| A18 | 0.000000000000E+00 | 0.000000000000E+00 |
| A20 | 0.000000000000E+00 | 0.000000000000E+00 |

Figure 11:
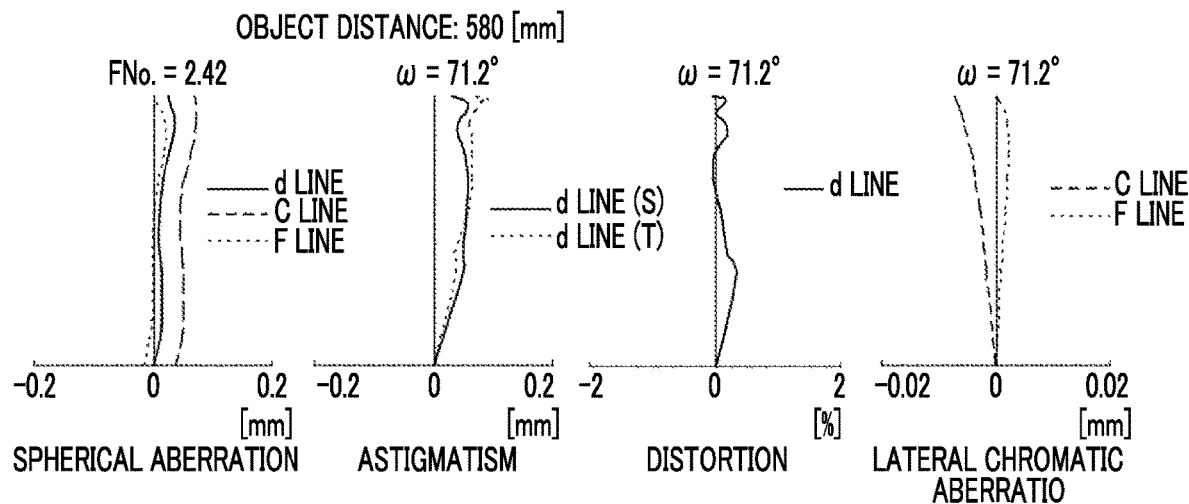
FIG. 11 is a diagram of aberrations of the imaging optical system of Example 1 of the present disclosure.
Figure 11:
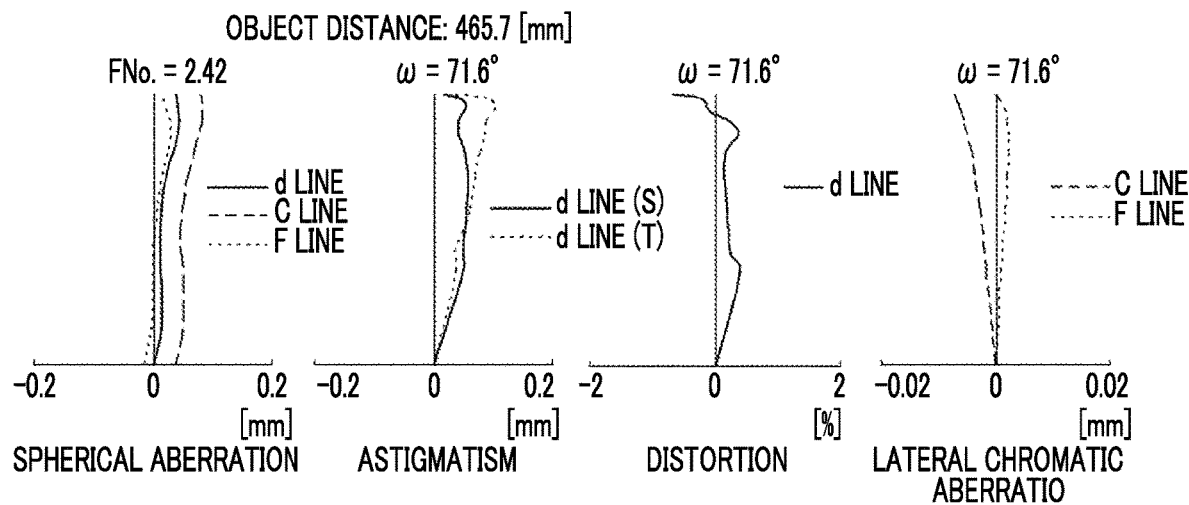
Figure 11:
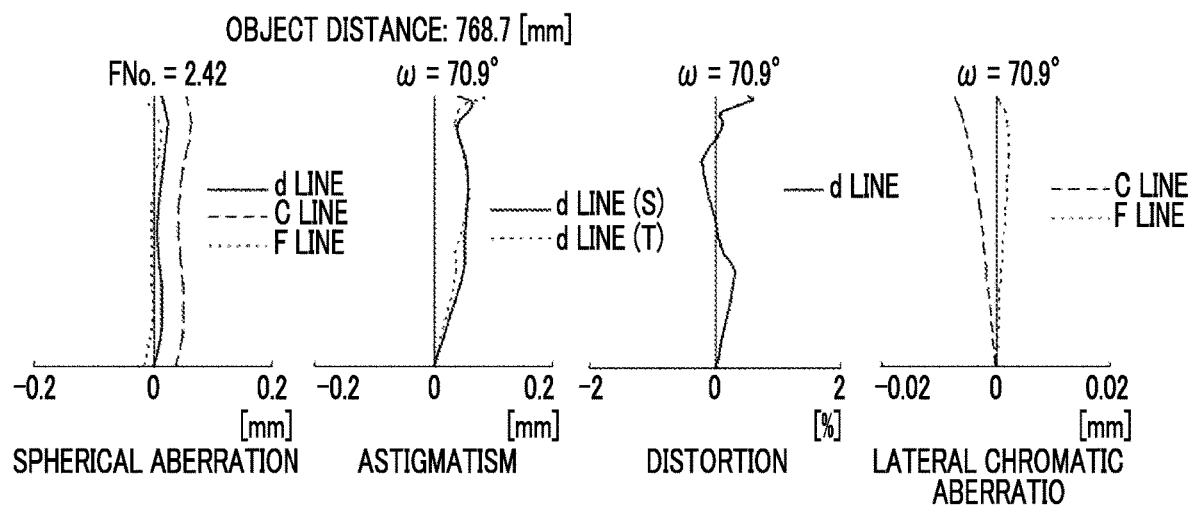

FIG. 11 shows a diagram of aberrations of the imaging optical system of Example 1. In order from the left side of FIG. 11, spherical aberration, astigmatism, distortion, and lateral chromatic aberration are shown. In FIG. 11, the upper part shows aberration diagrams in a case where the object distance is 580 mm (millimeters), the middle part shows aberration diagrams in a case where the object distance is 465.7 mm (millimeters), and the lower part shows aberration diagrams in a case where the object distance is 768.7 mm (millimeters). In the spherical aberration diagram, aberrations at the d line (a wavelength of 587.6 nm (nanometers)), the C line (a wavelength of 656.3 nm (nanometers)), and the F line (a wavelength of 486.1 nm (nanometers)) are respectively indicated by the solid line, the long dashed line, and the short dashed line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration, aberrations at the C line (a wavelength of 656.3 nm (nanometers)) and F line (a wavelength of 486.1 nm (nanometers)) are respectively indicated by the long dashed line and the short dashed line.

In the spherical aberration diagram, FNo. indicates an F number. In the other aberration diagrams, ω indicates a half angle of view.

Example 2

Figure 2:
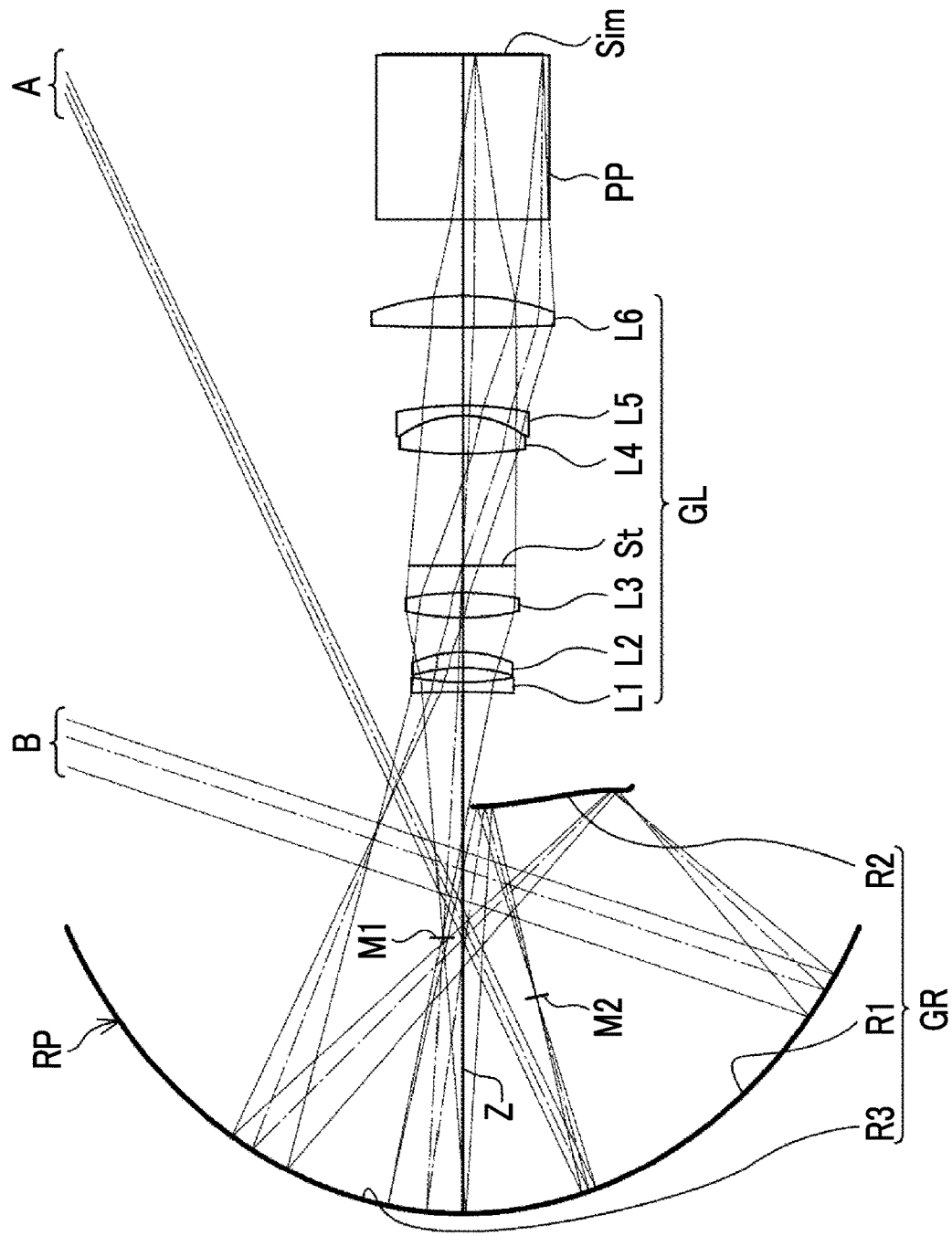
FIG. 2 is a cross-sectional view showing a configuration of an imaging optical system of Example 2 of the present disclosure.

Next, an imaging optical system of Example 2 will be described. FIG. 2 is a cross-sectional view showing a configuration of the imaging optical system of Example 2. It should be noted that illustration methods of examples in FIG. 2 and the following drawings are the same as that in FIG. 1 described above, and thus the description thereof is omitted.

The imaging optical system of Example 2 shown in FIG. 2 is composed of, in order along the optical path from the magnification side: a catoptric system GR consisting of three reflective surfaces including a first reflective surface R1, a second reflective surface R2, and a third reflective surface R3; and a dioptric system GL consisting of six lenses L1 to L6 and an aperture stop St. In the imaging optical system of Example 2, the second reflective surface R2 and the three lens groups of the lens L1, the lens L2, and the lens L3 move independently of each other during focusing.

Figure 12:
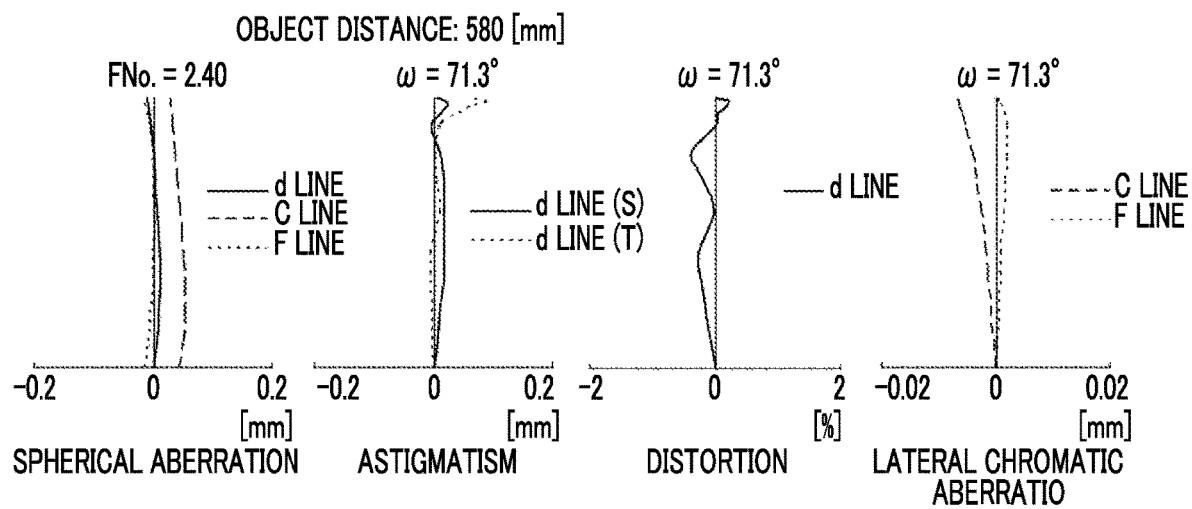
FIG. 12 is a diagram of aberrations of the imaging optical system of Example 2 of the present disclosure.
Figure 12:
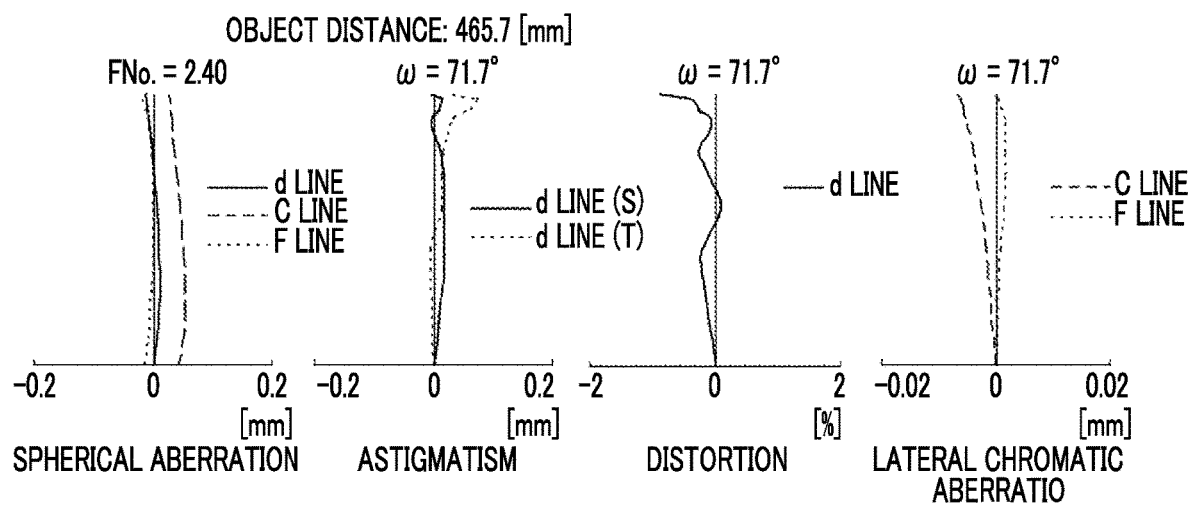
Figure 12:
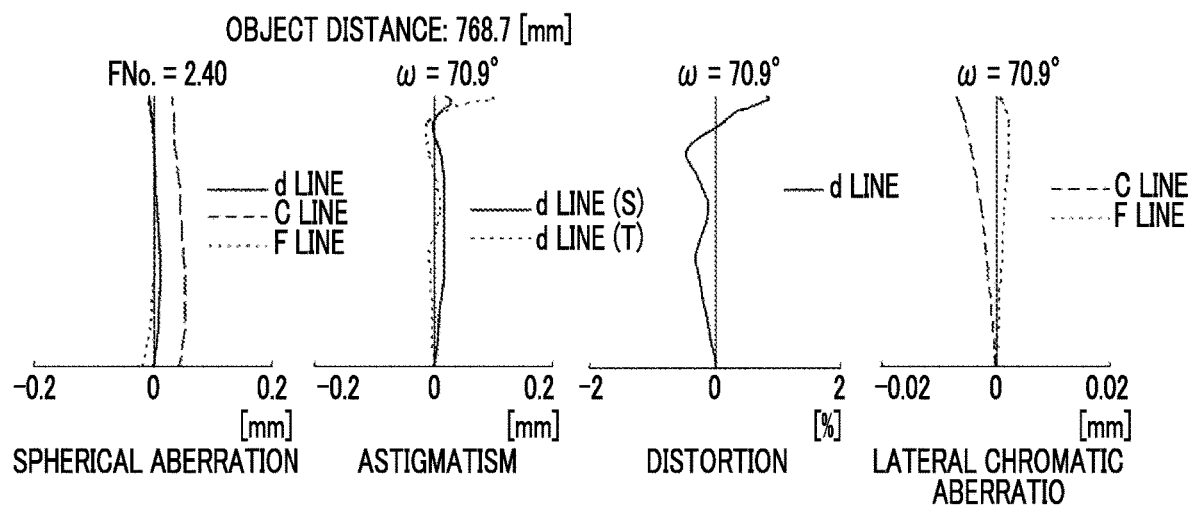

Table 5 shows basic lens data of the imaging optical system of Example 2, Table 6 shows data about specification, Table 7 shows data about variable surface distances, and Table 8 shows data about aspheric surface coefficients thereof. FIG. 12 shows aberration diagrams.

TABLE 5

Example 2•Lens Data

| Si | Ri | Di | Ndj | vdj |
|---|---|---|---|---|
| *1 | 56.0609 | DD[1] | Reflective surface | |
| *2 | 54.4207 | DD[2] | Reflective surface | |
| *3 | 56.0609 | DD[3] | Reflective surface | |
| 4 | −138.3314 | 1.5007 | 1.80518 | 25.42 |
| 5 | 37.7040 | 2.2927 | | |
| 6 | −26.3535 | 2.4872 | 1.48749 | 70.44 |
| 7 | −18.6161 | 5.3868 | | |
| 8 | 36.7009 | 3.9411 | 1.62588 | 35.70 |
| 9 | −43.2626 | DD[10] | | |
| 10 (Stop) | ∞ | 17.6800 | | |
| 11 | 65.1918 | 6.0112 | 1.49700 | 81.61 |
| 12 | −16.1174 | 1.5809 | 1.80518 | 25.42 |
| 13 | −50.9478 | 12.4039 | | |
| 14 | 310.6279 | 4.9931 | 1.80400 | 46.53 |
| 15 | −40.2969 | 12.0000 | | |
| 16 | ∞ | 26.0500 | 1.51680 | 64.20 |
| 17 | ∞ | 0.1842 | | |

TABLE 6

Example 2•Specification (d line)

| f | 4.31 |
|---|---|
| Bf | 29.36 |
| FNo. | 2.40 |
| 2ω[°] | 142.6 |

TABLE 7

Example 2•Variable Surface Distance

| | Object distance | | |
|---|---|---|---|
| | 580 | 465.7 | 768.7 |
| DD[1] | 64.3685 | 64.6623 | 64.0776 |
| DD[2] | −64.3685 | −64.6623 | −64.0776 |

TABLE 7-continued

Example 2•Variable Surface Distance

| | Object distance | | |
|---|---|---|---|
| | 580 | 465.7 | 768.7 |
| DD[3] | 82.4967 | 82.409 | 82.5849 |
| DD[10] | 4.269 | 4.3568 | 4.1808 |

TABLE 8

Example 2•Aspheric Surface Coefficient

| Si | *1, *3 | *2 |
|---|---|---|
| KA | 3.779687455564E−01 | 4.202280804167E+00 |
| A3 | −2.667241776747E−06 | 2.968641047861E−05 |
| A4 | 7.770521214669E−07 | −1.773442406997E−05 |
| A5 | −7.124291038889E−08 | 9.169489138115E−07 |
| A6 | 3.429422457431E−09 | −1.510055323918E−07 |
| A7 | −5.631547824549E−11 | 1.590177957984E−08 |
| A8 | −1.181267221498E−12 | −4.514706827564E−10 |
| A9 | 5.454391476735E−14 | −5.155147614990E−11 |
| A10 | −2.407555008628E−16 | 3.519594675817E−12 |
| A11 | −1.467562525986E−17 | 2.494268998731E−14 |
| A12 | 1.692365486226E−19 | −6.174030209701E−15 |
| A13 | 1.518392901347E−21 | 5.249593013026E−17 |
| A14 | −2.704228514735E−23 | 4.147393823072E−18 |
| A15 | −4.131284955710E−26 | −4.602491487081E−20 |
| A16 | 1.392059836099E−27 | −8.637143700878E−22 |

Example 3

Figure 3:
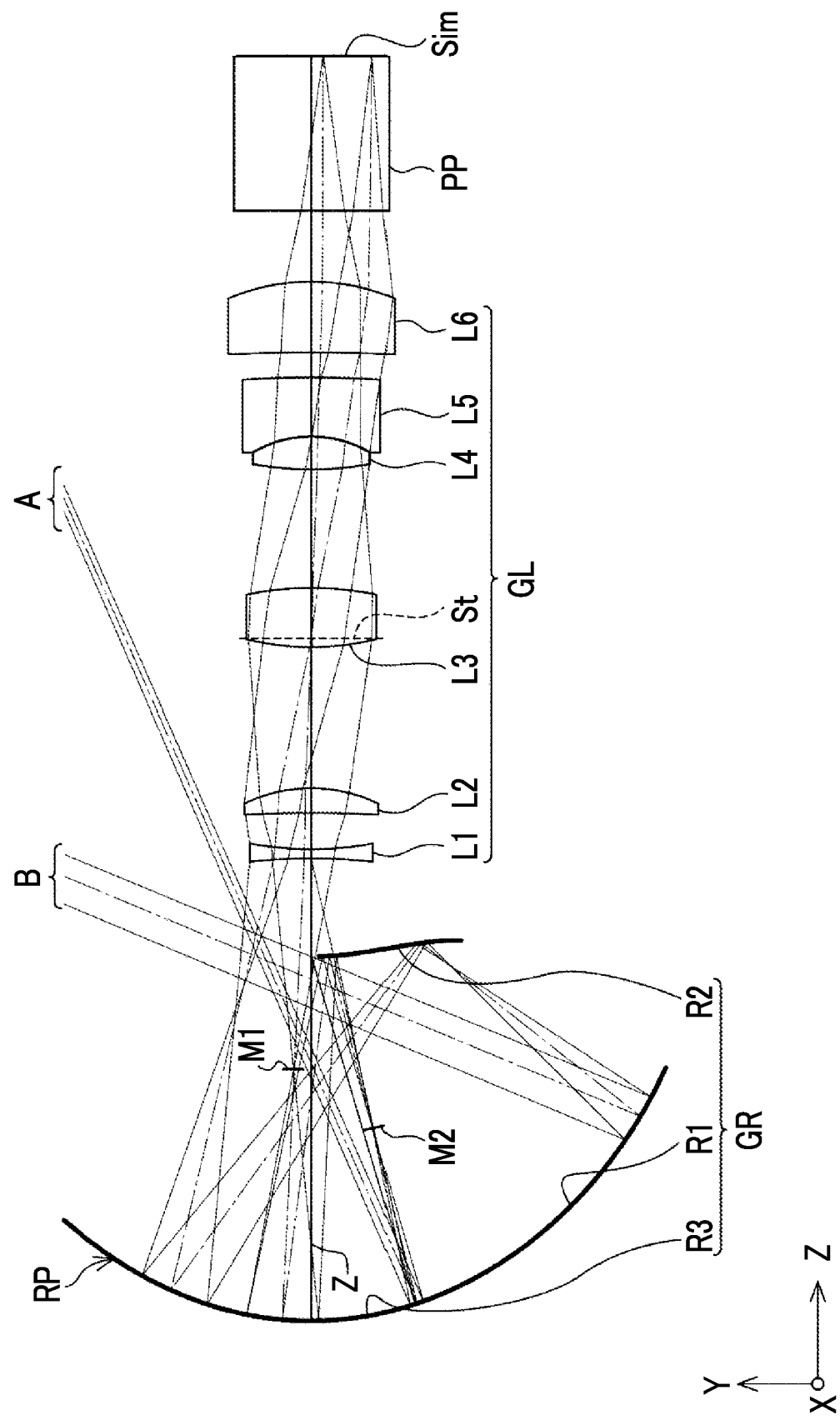
FIG. 3 is a cross-sectional view showing a configuration of an imaging optical system of Example 3 of the present disclosure.

Next, an imaging optical system of Example 3 will be described. FIG. 3 is a cross-sectional view showing a configuration of the imaging optical system of Example 3. The imaging optical system of Example 3 is composed of, in order along the optical path from the magnification side: a catoptric system GR consisting of three reflective surfaces including a first reflective surface R1, a second reflective surface R2, and a third reflective surface R3; and a dioptric system GL consisting of six lenses L1 to L6. In the imaging optical system of Example 3, the second reflective surface R2 and the lens L1 move independently of each other during focusing.

In the imaging optical system of Example 3, the second reflective surface R2 is formed as an aspheric surface, and the first reflective surface R1 and the third reflective surface R3 are formed as a free-form surfaces which are rotationally asymmetric and not axially symmetric. The first reflective surface R1 and the third reflective surface R3 are arranged to be eccentric (shifted in the Y direction) and tilted (rotated about the X axis) with respect to the optical axis Z. The amount of shift in the Y direction is 17.3235 mm (millimeters) in the negative direction in a case where the upper direction is the positive direction and the lower direction is the negative direction in FIG. 3. The amount of tilt in the X axis rotation is 17.1861° counterclockwise. Table 9 shows basic lens data of the imaging optical system of Example 3, Table 10 shows data about specification, Table 11 shows data about variable surface distances, and Table 12 shows data about aspheric surface coefficients thereof.

In the lens data in Table 9, "**" sign is attached to the surface number of the free-form surface, and the radius of curvature of the free-form surface is represented by infinity (∞). Table 13 shows data about free-form surfaces. The data about the free-form surfaces in Table 13 shows the surface numbers of the free-form surfaces and the free-form surface coefficients relating to the free-form surfaces. The "E±n" (n: an integer) in numerical values of the free-form surface coefficients of Table 13 means "×10$^{±n}$". The free-form surface coefficient shown in Table 13 is a value of the rotationally asymmetric free-form surface coefficient C(i, j) in the free-form surface expression represented by the following expression.

$$Z = \Sigma\Sigma C(i,j) \cdot X^i \cdot Y^j$$

X, Y, and Z are coordinates in a state where the surface vertex is set as the origin. Further, in the above expression, the value of X is an absolute value. In the above expression, the first Σ is the sum for i, and the second Σ is the sum for j.

TABLE 9

Example 3•Lens Data

| Si | Ri | Di | Ndj | vdj |
|---|---|---|---|---|
| **1 | ∞ | DD[1] | Reflective surface | |
| *2 | 56.3846 | DD[2] | Reflective surface | |
| **3 | ∞ | DD[3] | Reflective surface | |
| 4 | −94.8675 | 1.5694 | 1.80000 | 29.84 |
| 5 | 55.6831 | DD[5] | | |
| 6 | −211.8505 | 4.1923 | 1.59551 | 39.24 |
| 7 | −25.5797 | 23.7736 | | |
| 8 | 45.7566 | 1.4264 | 1.51680 | |
| 9 (Stop) | ∞ | 8.5845 | 1.51680 | 64.20 |
| 10 | −52.2387 | 20.0680 | | |
| 11 | 53.1537 | 5.5671 | 1.48749 | 70.44 |
| 12 | −19.1651 | 9.9991 | 1.84666 | 23.78 |
| 13 | −161.9960 | 4.2220 | | |
| 14 | −319.9720 | 11.9995 | 1.80000 | 29.84 |
| 15 | −35.2861 | 12.0000 | | |
| 16 | ∞ | 26.0500 | 1.51680 | 64.20 |
| 17 | ∞ | 0.2129 | | |

TABLE 10

Example 3•Specification (d line)

| Bf | 29.39 |
|---|---|
| FNo. | 2.40 |
| 2ω[°] | 142.0 |

TABLE 11

Example 3•Variable Surface Distance

| | Object distance | | |
|---|---|---|---|
| | 580 | 465.7 | 768.7 |
| DD[1] | 58.8408 | 59.1223 | 58.5518 |
| DD[2] | −58.8408 | −59.1223 | −58.5518 |
| DD[3] | 75.4318 | 75.4625 | 75.3982 |
| DD[5] | 6.1288 | 6.0981 | 6.1623 |

TABLE 12

Example 3•Aspheric Surface Coefficient

| Si | *2 |
|---|---|
| KA | 3.364555012630E+00 |
| A3 | 4.783977250778E−04 |
| A4 | −1.151413777505E−04 |
| A5 | 8.650255816510E−06 |

TABLE 12-continued

Example 3•Aspheric Surface Coefficient

| Si | *2 |
|---|---|
| A6 | 1.097205914881E−07 |
| A7 | −5.736370398905E−08 |
| A8 | 2.025454108394E−09 |
| A9 | 1.178216334947E−10 |
| A10 | −8.211042222998E−12 |
| A11 | −3.165825233105E−14 |
| A12 | 1.17477E−14 |
| A13 | −1.55249E−16 |
| A14 | −5.600776672226E−18 |
| A15 | 1.224866653374E−19 |
| A16 | −9.641261544125E−23 |

TABLE 13

Example 3• Free-Form Surface Coefficient

| Si | **1, **3 | Si | **1, **3 |
|---|---|---|---|
| C(1, 0) | 0.000000000000E+00 | C(1, 6) | 6.094501624585E−13 |
| C(0, 1) | −2.100999901127E−02 | C(0, 7) | 1.957698428365E−13 |
| C(2, 0) | 9.010757270712E−03 | C(8, 0) | 1.627046537692E−12 |
| C(1, 1) | −5.869795122333E−06 | C(7, 1) | 3.012339218732E−13 |
| C(0, 2) | 8.592077082103E−03 | C(6, 2) | 4.965450007417E−14 |
| C(3, 0) | 2.591170352692E−06 | C(5, 3) | 1.714012138012E−13 |
| C(2, 1) | 2.633013055719E−05 | C(4, 4) | −2.278346386439E−13 |
| C(1, 2) | 6.165171569549E−07 | C(3, 5) | −2.189485679533E−13 |
| C(0, 3) | 2.017522700269E−05 | C(2, 6) | −2.329835954937E−13 |
| C(4, 0) | 3.311531379992E−07 | C(1, 7) | −8.879101087038E−15 |
| C(3, 1) | −2.786566932867E−07 | C(0, 8) | −3.099289476125E−14 |
| C(2, 2) | 6.382460735633E−07 | C(9, 0) | −2.233251327598E−14 |
| C(1, 3) | −4.381499086239E−09 | C(8, 1) | −1.789326293848E−15 |
| C(0, 4) | 4.110613533939E−07 | C(7, 2) | −6.683841048762E−15 |
| C(5, 0) | −1.414110134342E−08 | C(6, 3) | −5.544578068488E−16 |
| C(4, 1) | 5.212732177704E−09 | C(5, 4) | −2.578956586518E−15 |
| C(3, 2) | 8.501938310926E−10 | C(4, 5) | 3.779887071932E−15 |
| C(2, 3) | −4.268799665359E−09 | C(3, 6) | 3.948928828233E−16 |
| C(1, 4) | −1.013747542928E−09 | C(2, 7) | 2.691578919730E−16 |
| C(0, 5) | 6.610057956543E−10 | C(1, 8) | −1.301530469603E−16 |
| C(6, 0) | 1.370896346157E−09 | C(0, 9) | 1.414414791812E−16 |
| C(5, 1) | 2.130732294155E−10 | C(10, 0) | 1.256750276266E−16 |
| C(4, 2) | 4.302703813970E−10 | C(9, 1) | −6.048583960154E−19 |
| C(3, 3) | 4.585561792041E−10 | C(8, 2) | 1.056055679948E−16 |
| C(2, 4) | 5.708230490636E−10 | C(7, 3) | −6.863043217700E−20 |
| C(1, 5) | 1.505258088657E−11 | C(6, 4) | 1.385656094690E−16 |
| C(0, 6) | 1.260847611437E−10 | C(5, 5) | 1.210740156471E−18 |
| C(7, 0) | −6.125122964501E−11 | C(4, 6) | 1.300624330195E−16 |
| C(6, 1) | −1.477287438855E−11 | C(3, 7) | 3.854784188521E−17 |
| C(5, 2) | −6.617225142059E−13 | C(2, 8) | 6.460963921101E−17 |
| C(4, 3) | −1.241686002348E−11 | C(1, 9) | 1.545765830599E−18 |
| C(3, 4) | −2.406812809606E−12 | C(0, 10) | 8.862296381015E−18 |
| C(2, 5) | 2.684010114231E−12 | | |

Figure 13:
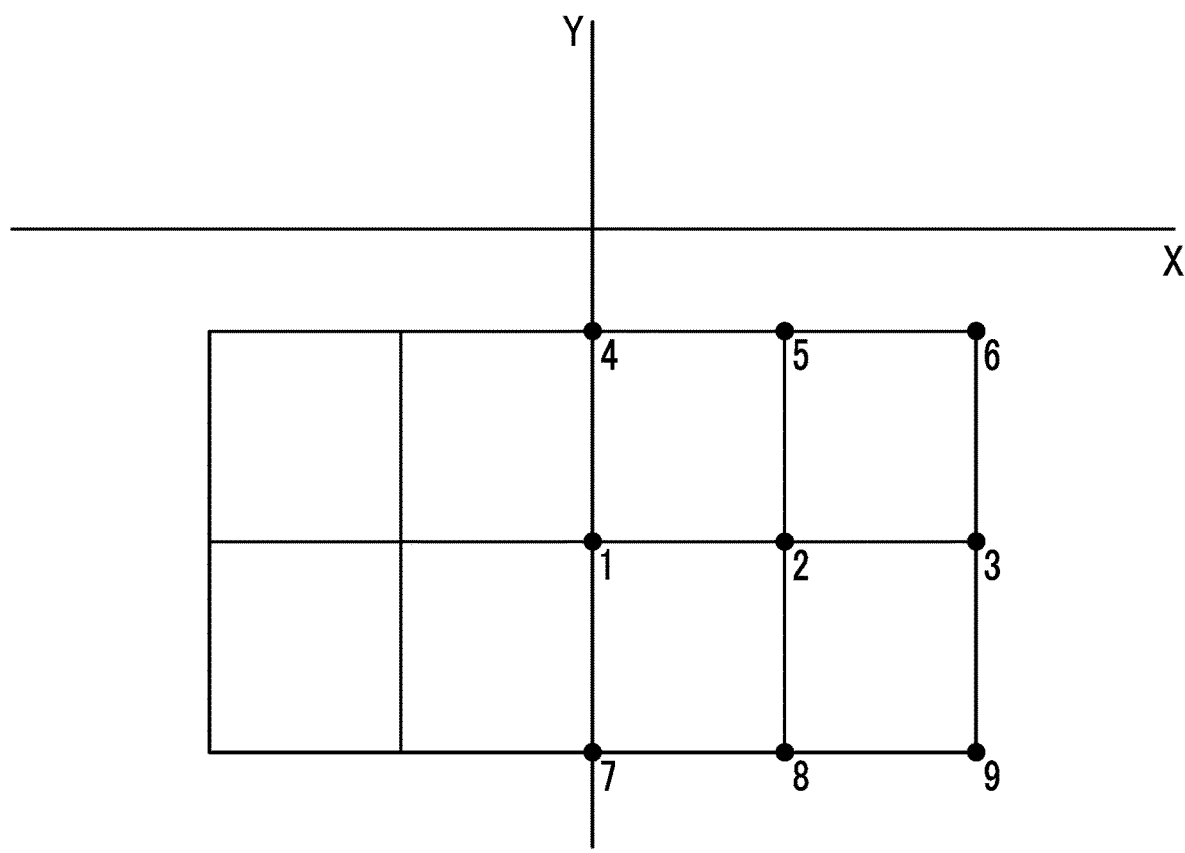
FIG. 13 is an explanatory diagram of a target position on the reduction side imaging surface of Example 3 of the present disclosure.
Figure 14:
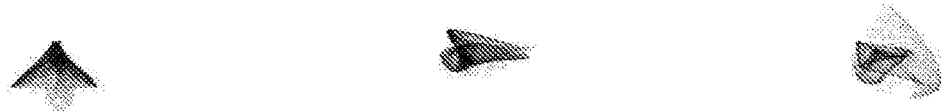
FIG. 14 is a spot diagram in a case where the object distance of Example 3 of the present disclosure is 580 mm (millimeters).
Figure 14:
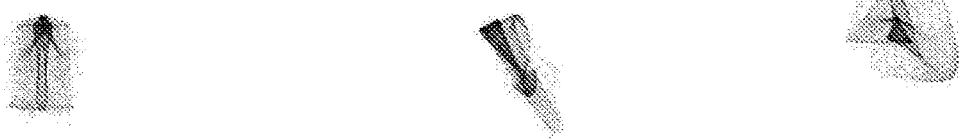
Figure 14:
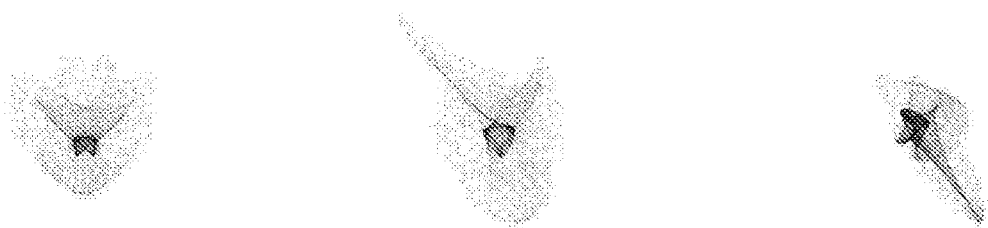
Figure 15:
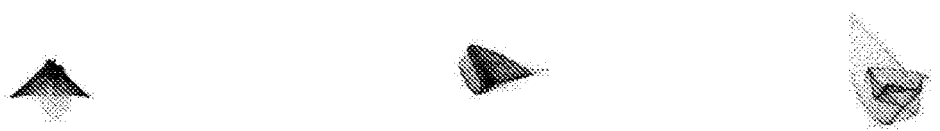
FIG. 15 is a spot diagram in a case where the object distance of Example 3 of the present disclosure is 465.7 mm (millimeters).
Figure 15:
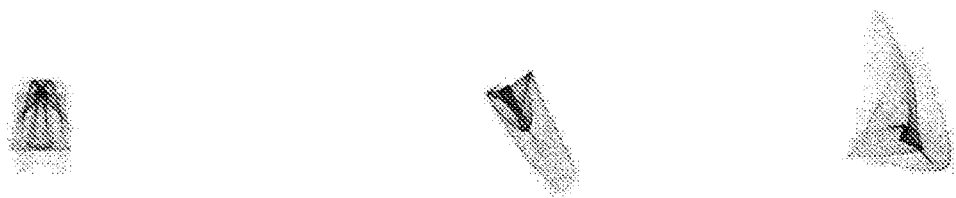
Figure 15:
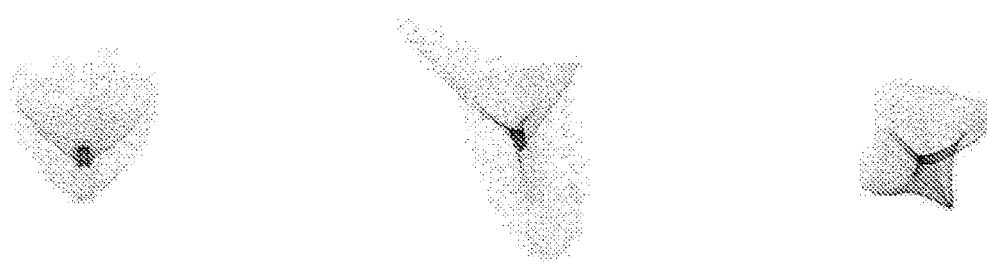
Figure 16:
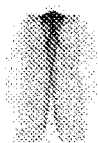
FIG. 16 is a spot diagram in a case where the object distance of Example 3 of the present disclosure is 768.7 mm (millimeters).
Figure 16:
Figure 16:
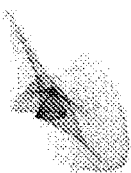
Figure 16:
Figure 16:
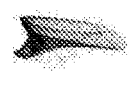
Figure 16:
Figure 16:
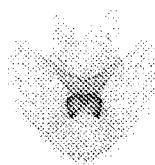
Figure 16:
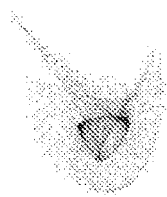
Figure 16:
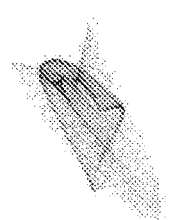
Figure 16:
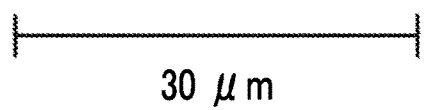

In the imaging optical system of Example 3, the first reflective surface R1 and the third reflective surface R3 have free-form surface shapes. Instead of showing aberration diagrams, as shown in FIGS. 14 to 16, a spot diagram in a case of ray tracing from the magnification side to the reduction side is shown. FIG. 13 shows a reduction side imaging surface (image display surface Sim) that is an imaging position of the spot image in a case of ray tracing from the magnification side. FIGS. 14 to 16 show spot diagrams each showing nine spot images at the respective grid points of Nos. 1 to 9 on the reduction side imaging surface of FIG. 13.

As shown in FIG. 13, the reduction side imaging surface has a horizontally long rectangular shape, and has a size of the horizontal length of 14.52 mm (millimeters)×the vertical length of 8.16 mm (millimeters). In FIG. 13, the inside of the reduction side imaging surface is shown to be divided into 8 cells by a grid for convenience, and the grid points of Nos.

1 to 9 are set in the right half from the center position in the X direction. The center of the reduction side imaging surface is the grid point of No. 1, and the grid point of No. 1 is a position on XY coordinates in a state where the optical axis Z is set as the origin (X=0 mm (millimeter) and Y=−6.08 mm (millimeters)). In a state where the grid point of No. 1 is set as the base point, the grid points of Nos. 2 to 9 are set with distances of 3.63 mm (millimeters) in the horizontal direction and 4.08 mm (millimeters) in the vertical direction.

Each of the spot diagrams of FIGS. 14 to 16 shows a spot image at each grid point in a case where ray tracing is performed using as a target each of the grid points of Nos. 1 to 9 on the reduction side imaging surface shown in FIG. 13. FIG. 14 shows spot diagrams in a case where the object distance is 580 mm (millimeters), FIG. 15 shows spot diagrams in a case where the object distance is 467.7 mm (millimeters), and FIG. 16 shows spot diagrams in a case where the object distance is 768.7 mm (millimeters). The scale of 30 μm (micrometers) shown in FIGS. 14 to 16 is a scale indicating the size of each spot image, and does not indicate the distance between the spot images. The center position of each spot image corresponds to each grid point, and the distance between each grid point is 3.63 mm (millimeters) in the horizontal direction and 4.08 mm (millimeters) in the vertical direction as described above.

Example 4

Figure 4:
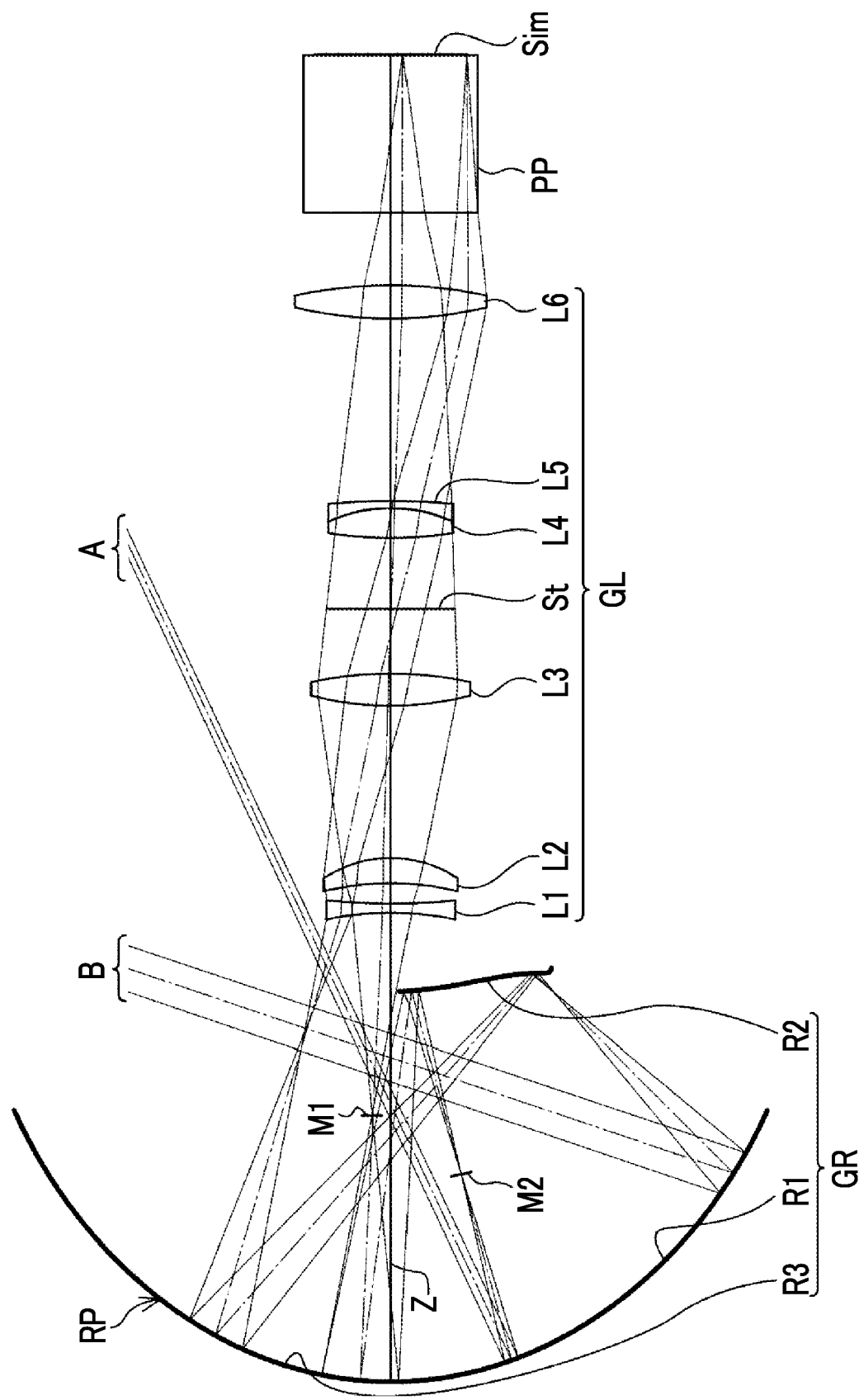
FIG. 4 is a cross-sectional view showing a configuration of an imaging optical system of Example 4 of the present disclosure.
Figure 17:
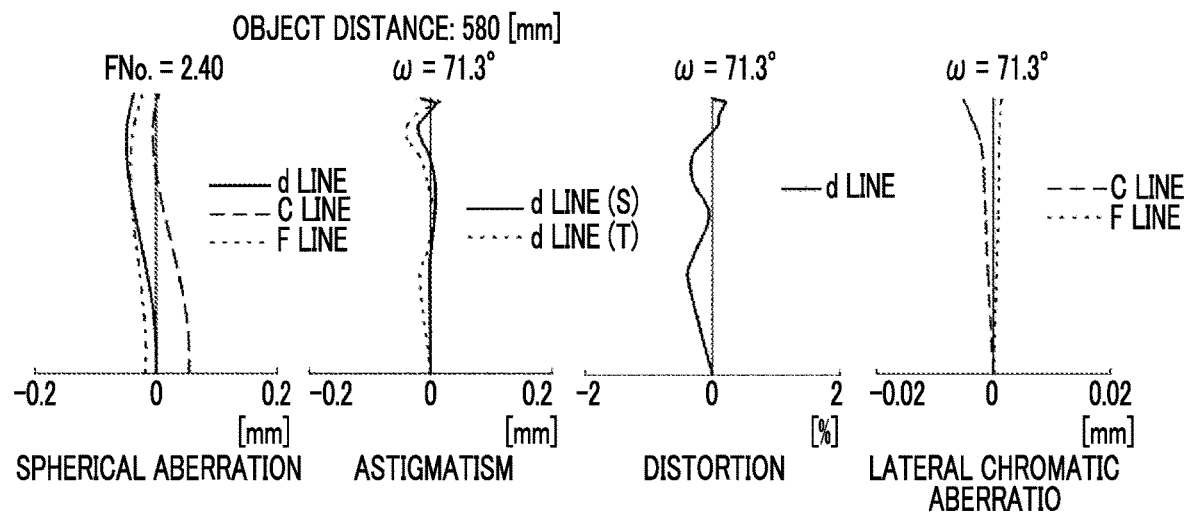
FIG. 17 is a diagram of aberrations of the imaging optical system of Example 4 of the present disclosure.
Figure 17:
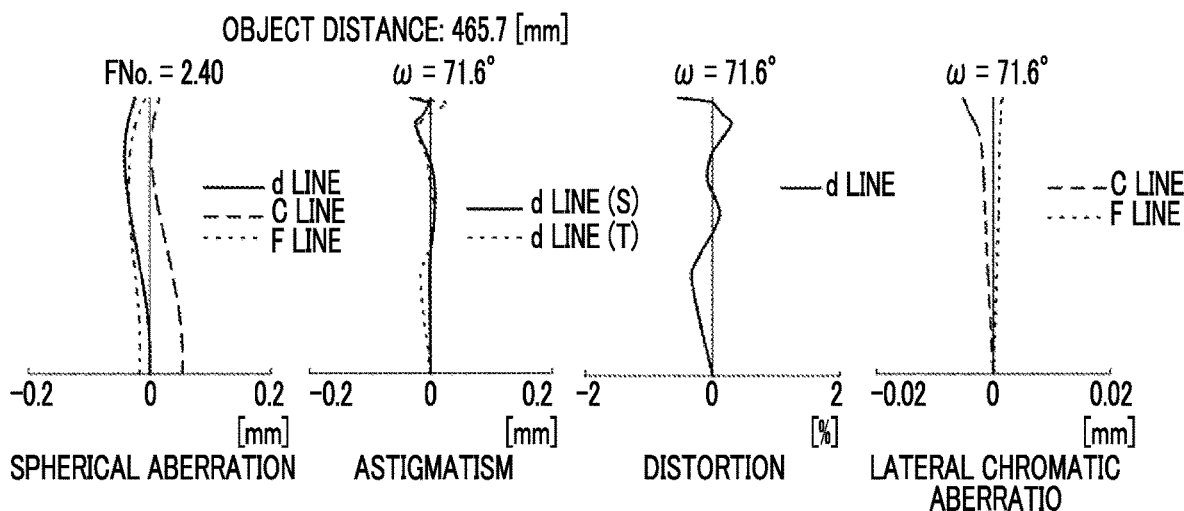
Figure 17:
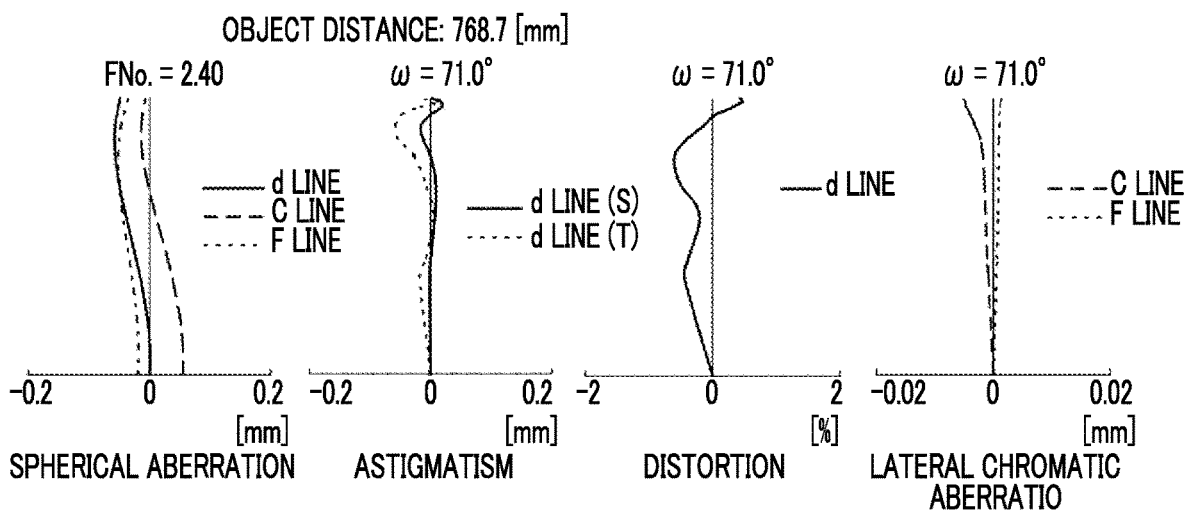

Next, an imaging optical system of Example 4 will be described. FIG. 4 is a cross-sectional view showing a configuration of the imaging optical system of Example 4. The imaging optical system of Example 4 is composed of, in order from the magnification side along the optical path: a catoptric system GR consisting of three reflective surfaces including a first reflective surface R1, a second reflective surface R2, and a third reflective surface R3; and a dioptric system GL consisting of six lenses L1 to L6 and an aperture stop St. During focusing, the second reflective surface R2 and the group consisting of the lens L1 and the lens L2 move independently. Table 14 shows basic lens data of the imaging optical system of Example 4, Table 15 shows data about specification, Table 16 shows data about variable surface distances, and Table 17 shows data about aspheric surface coefficients thereof. FIG. 17 shows aberration diagrams.

TABLE 14

Example 4·Lens Data

| Si | Ri | Di | Ndj | vdj |
|---|---|---|---|---|
| *1 | 53.9872 | DD[1] | Reflective surface | |
| *2 | 56.2357 | DD[2] | Reflective surface | |
| *3 | 53.9872 | DD[3] | Reflective surface | |
| 4 | −50.6514 | 1.5005 | 1.89190 | 37.13 |
| 5 | 105.0250 | 3.3812 | | |
| 6 | −45.6015 | 4.1824 | 1.48749 | 70.24 |
| 7 | −19.6223 | DD[7] | | |
| 8 | 50.8901 | 5.3322 | 1.56732 | 42.82 |
| 9 | −61.3088 | 10.6955 | | |
| 10 (Stop) | ∞ | 11.7386 | | |
| 11 | 65.8624 | 4.9523 | 1.49700 | 81.61 |
| 12 | −24.2760 | 1.2001 | 1.80518 | 25.42 |
| 13 | −104.1112 | 30.0000 | | |
| 14 | 67.3837 | 5.5462 | 1.65160 | 58.55 |
| 15 | −73.6806 | 12.0000 | | |
| 16 | ∞ | 26.0500 | 1.51680 | 64.20 |
| 17 | ∞ | 0.2023 | | |

TABLE 15

Example 4·Specification (d line)

| |f| | 4.30 |
|---|---|
| Bf | 29.30 |
| FNo. | 2.40 |
| 2ω[°] | 142.6 |

TABLE 16

Example 4·Variable Surface Distance

| | Object distance | | |
|---|---|---|---|
| | 580 | 465.7 | 768.7 |
| DD[1] | 64.474 | 64.679 | 64.276 |
| DD[2] | −64.474 | −64.679 | −64.276 |
| DD[3] | 77.509 | 77.68 | 77.342 |
| DD[5] | 25.171 | 25.001 | 25.338 |

TABLE 17

Example 4·Aspheric Surface Coefficient

| Si | *1, *3 | *2 |
|---|---|---|
| KA | 3.923304604182E−01 | 3.450658405341E+00 |
| A3 | −3.944221210267E−07 | 5.339668838777E−05 |
| A4 | 4.169951992823E−07 | −3.720560525009E−05 |
| A5 | −5.393468241614E−08 | 5.450647646924E−06 |
| A6 | 3.634259326094E−09 | −5.773152441655E−07 |
| A7 | −9.643643063214E−11 | 2.130869205051E−08 |
| A8 | −4.286587913897E−13 | 1.329825716005E−09 |
| A9 | 7.044195654675E−14 | −1.484226598521E−10 |
| A10 | −7.819964846115E−16 | 1.829715792622E−12 |
| A11 | −1.582026378980E−17 | 2.642303629467E−13 |
| A12 | 3.080992623918E−19 | −8.270732942295E−15 |
| A13 | 1.133238595536E−21 | −1.817034929865E−16 |
| A14 | −4.180920329573E−23 | 8.658387209083E−18 |
| A15 | 1.172837576461E−26 | 3.592032671207E−20 |
| A16 | 1.889932186530E−27 | −2.945041037161E−21 |

Figure 5:
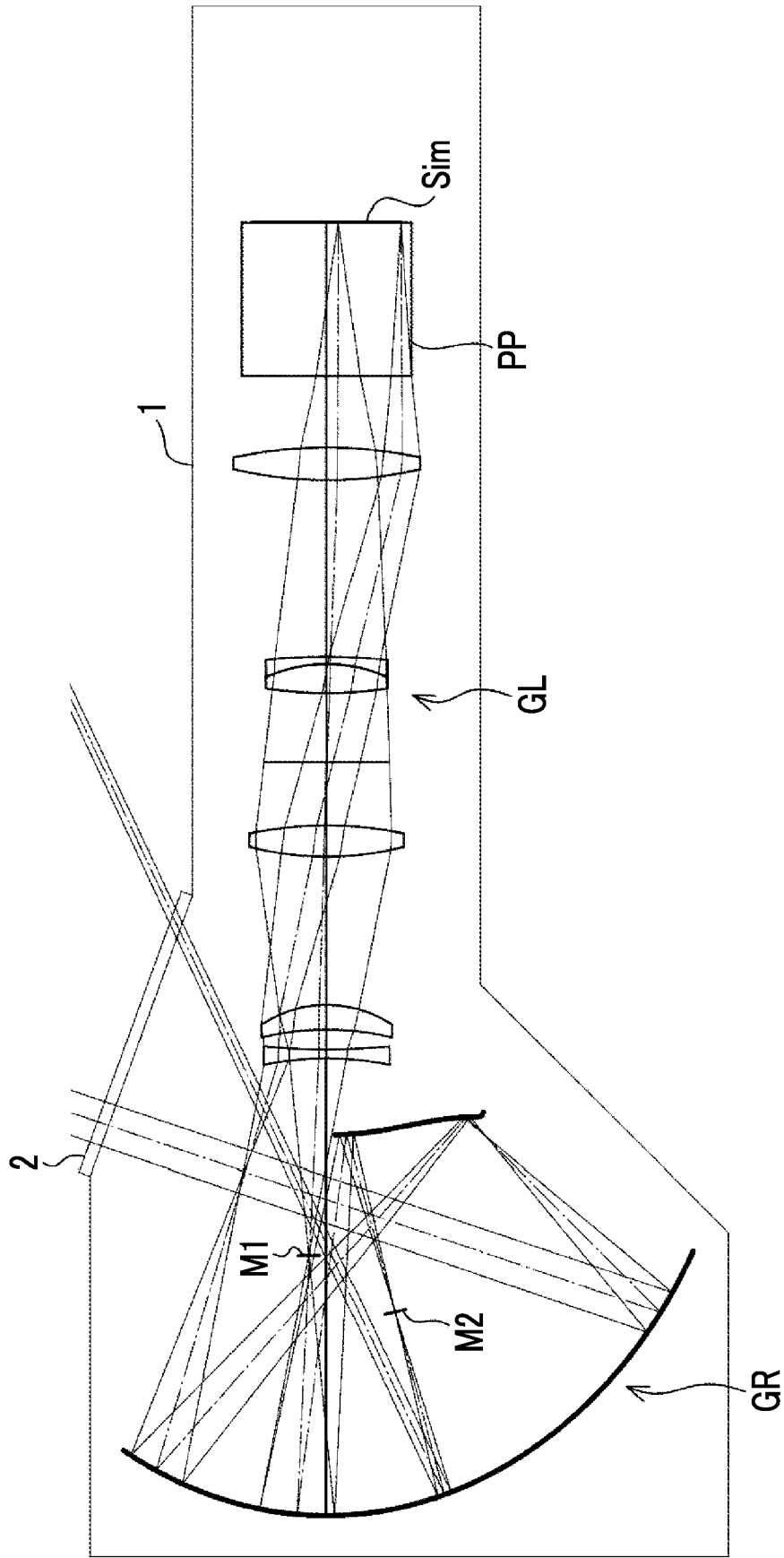
FIG. 5 is a cross-sectional view showing a state in which the imaging optical system of Example 4 of the present disclosure is housed in a housing.

Example 4A shown in FIG. 5 is an example in which the imaging optical system of Example 4 shown in FIG. 1 is housed in a housing 1 comprising an optical window 2.

Figure 6:
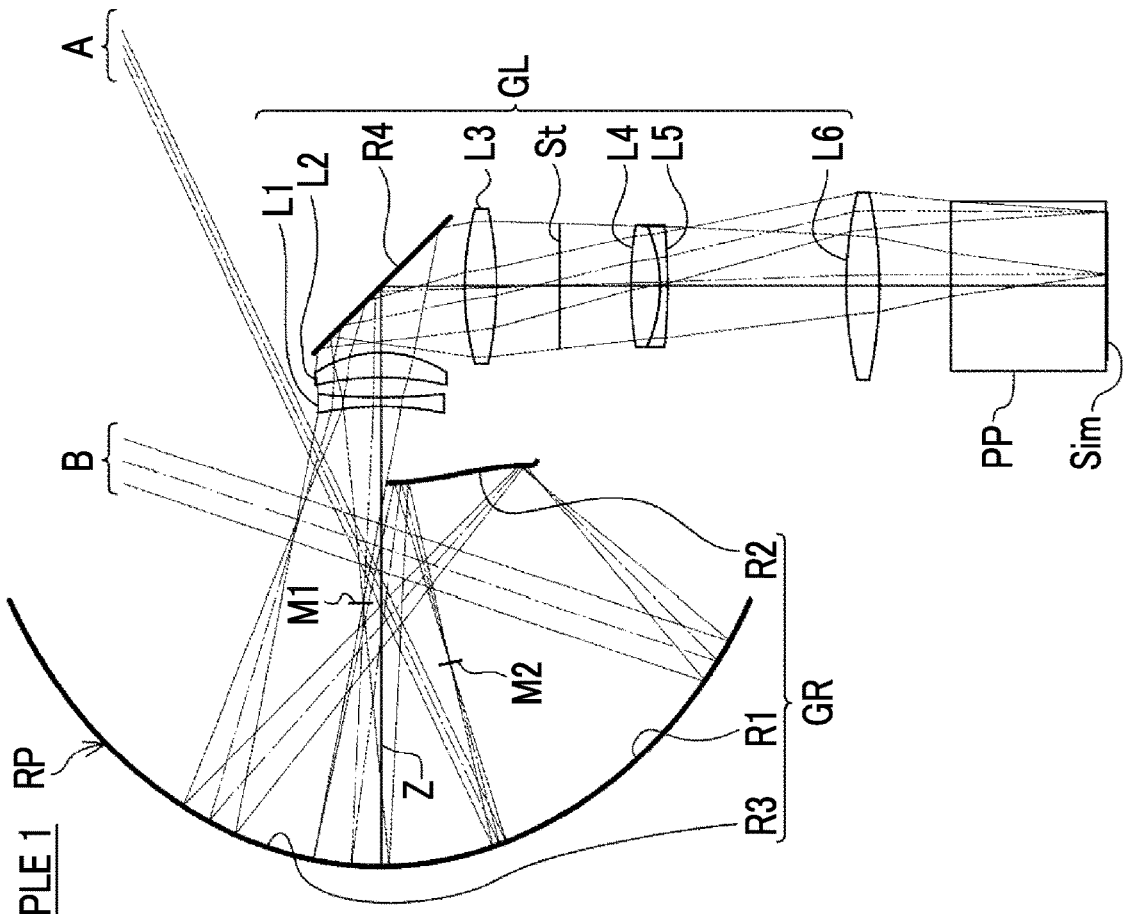
FIG. 6 is a cross-sectional view showing a configuration of an imaging optical system of Modification Example 1 of Example 4 of the present disclosure.

The imaging optical system of Modification Example 1 of Example 4 shown in FIG. 6 is configured such that one reflective surface R4 is added in the dioptric system GL and the optical axis Z is deflected by 90° in the dioptric system GL. In FIG. 6, the reflective surface R4 is disposed between the lens L2 and the lens L3 at a position shifted by 14 mm (millimeters) to the magnification side from the vertex of the surface No. 8 on the magnification side of the lens L3.

Figure 7:
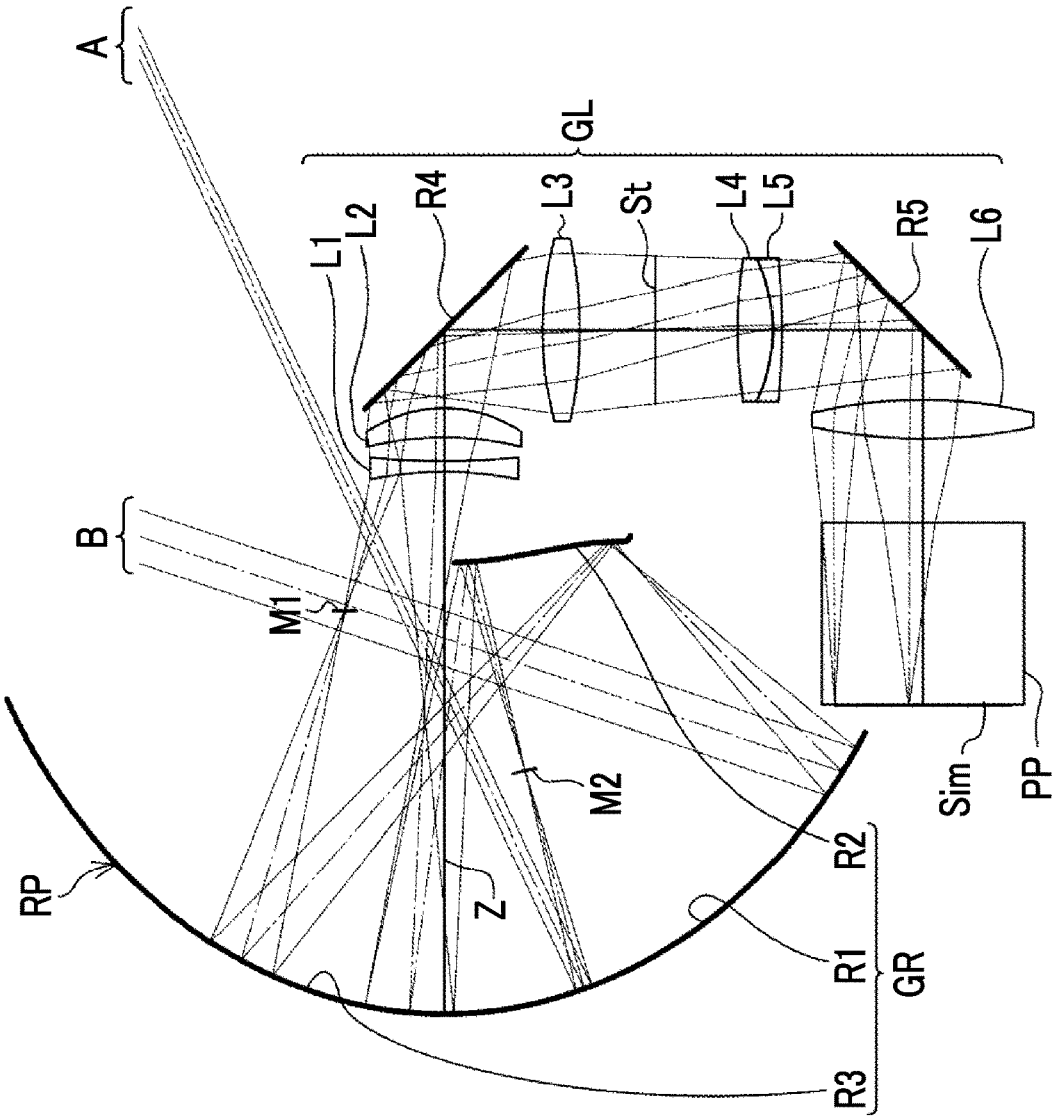
FIG. 7 is a cross-sectional view showing a configuration of an imaging optical system of Modification Example 2 of Example 4 of the present disclosure.

The imaging optical system of Modification Example 2 of Example 4 shown in FIG. 7 is configured such that two reflective surfaces including a reflective surface R4 and a reflective surface R5 are added in the dioptric system GL and the optical axis Z is deflected by 90° twice in the dioptric system GL. In FIG. 7, the direction of the optical axis Z from the reflective surface R4 toward the magnification side is the same as the direction of the optical axis Z from the reflective surface R5 toward the reduction side. In FIG. 7, the reflective surface R4 is disposed at a position shifted by 14 mm (millimeters) to the magnification side from the vertex of the surface No. 8 on the magnification side of the lens L3. In FIG. 7, the reflective surface R5 is disposed at a position shifted by 10 mm (millimeters) to the magnification side from the vertex of the surface No. 14 on the magnification side of the lens L6.

Figure 8:
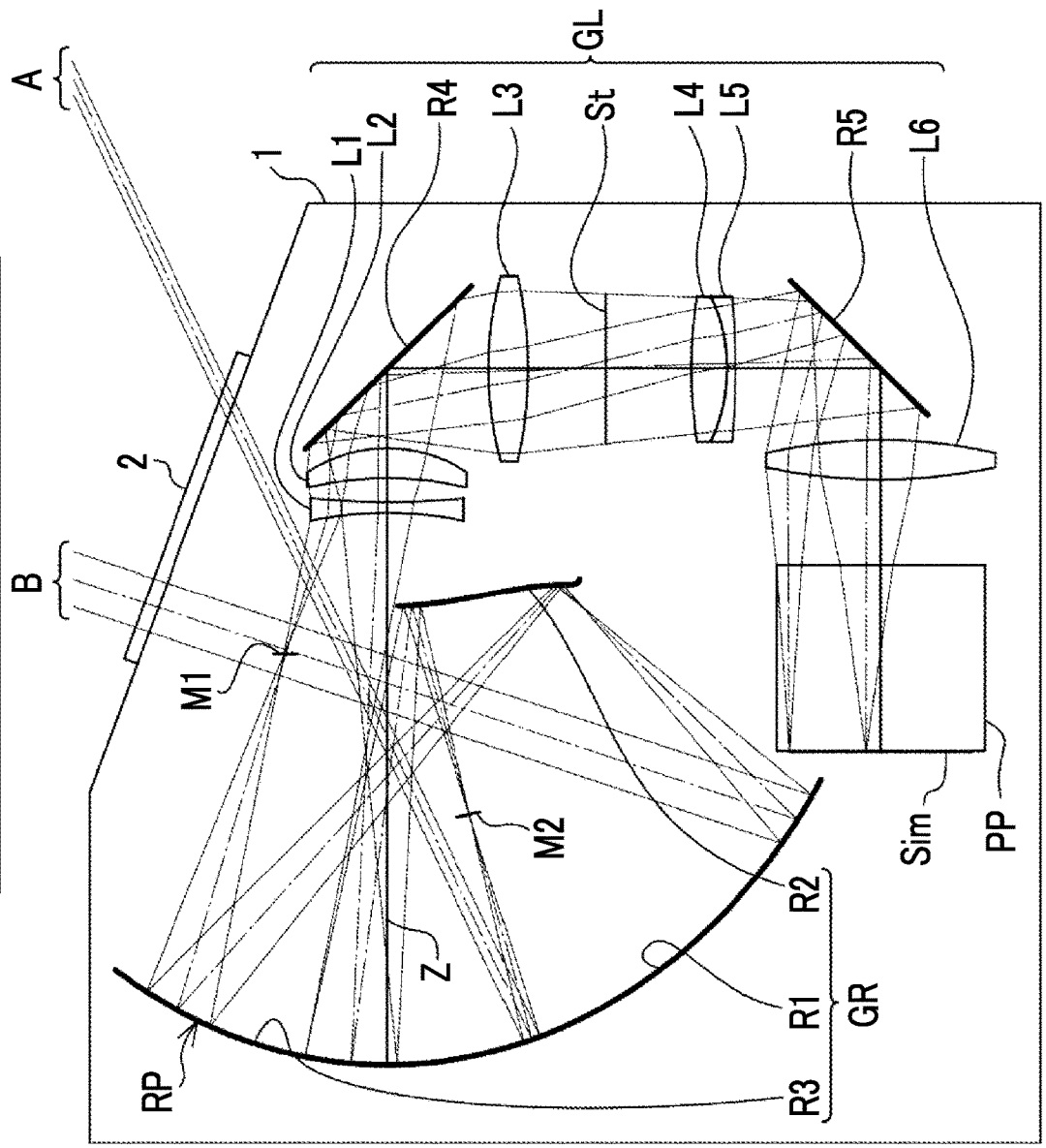
FIG. 8 is a cross-sectional view showing a state in which the imaging optical system according to Modification Example 2 of Example 4 of the present disclosure is housed in a housing.

Modification Example 2A of Example 4 shown in FIG. 8 is an example in which the imaging optical system of Modification Example 2 of Example 4 shown in FIG. 7 is housed in the housing 1 comprising the optical window 2.

Figure 9:
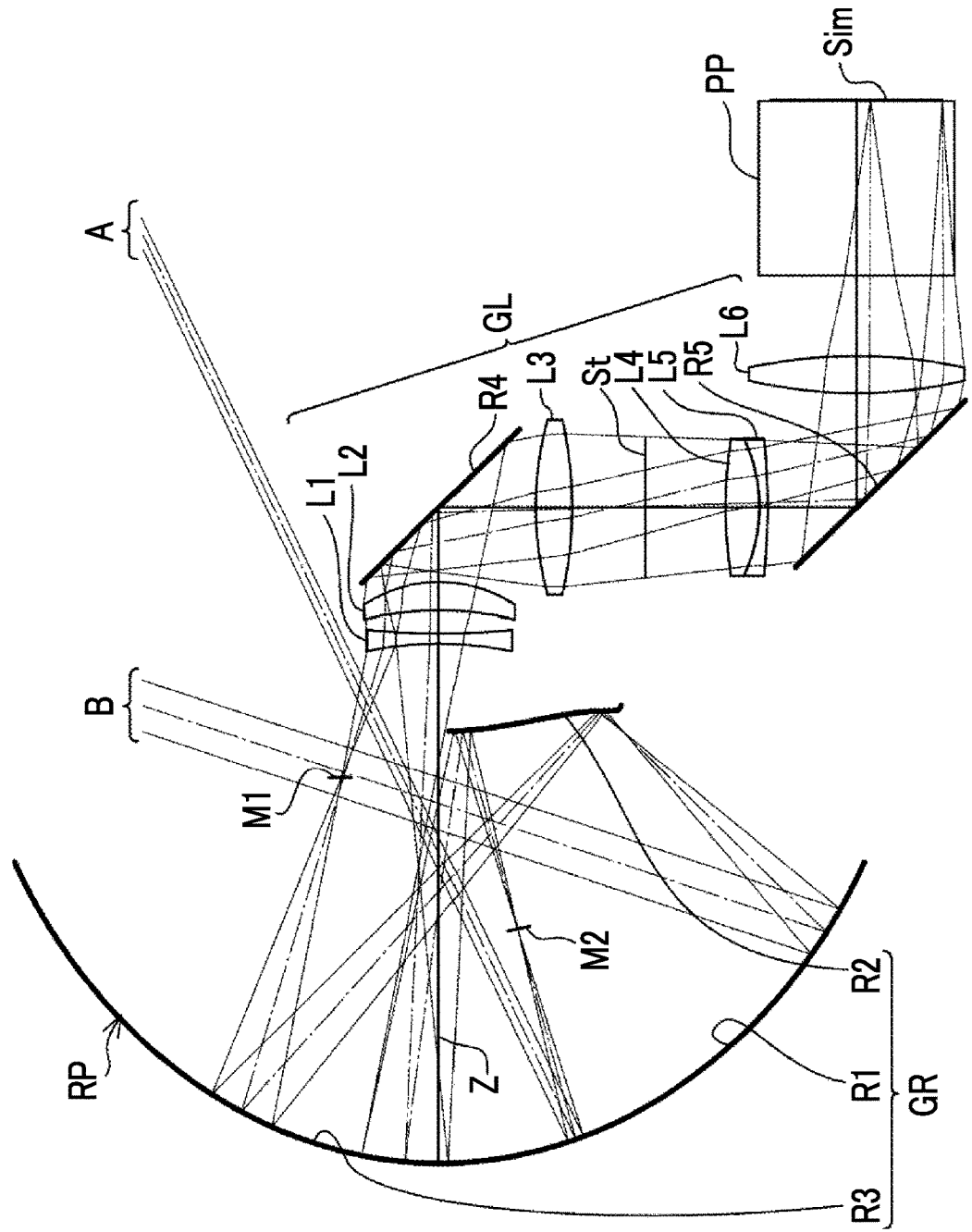
FIG. 9 is a cross-sectional view showing a configuration of an imaging optical system of Modification Example 3 of Example 4 of the present disclosure.

Similarly to Modification Example 2 shown in FIG. 7, the imaging optical system of Modification Example 3 of Example 4 shown in FIG. 9 is configured such that two reflective surfaces including a reflective surface R4 and a reflective surface R5 are added in the dioptric system GL and the optical axis Z is deflected by 90° twice in the dioptric system GL. In Modification Example 3 shown in FIG. 9, the direction of the reflective surface R5 is different from that in Modification Example 2 shown in FIG. 7, and the direction of the optical axis Z from the reflective surface R4 toward the magnification side and the direction of the optical axis Z from the reflective surface R5 toward the reduction side are reversed by 180°. In FIG. 9, similarly to FIG. 7, the reflective surface R4 is disposed at a position shifted by 14 mm (millimeters) to the magnification side from the vertex of the surface No. 8 on the magnification side of the lens L3. In FIG. 9, the reflective surface R5 is disposed at a position shifted by 17 mm (millimeters) to the magnification side from the vertex of the surface No. 14 on the magnification side of the lens L6.

Figure 10:
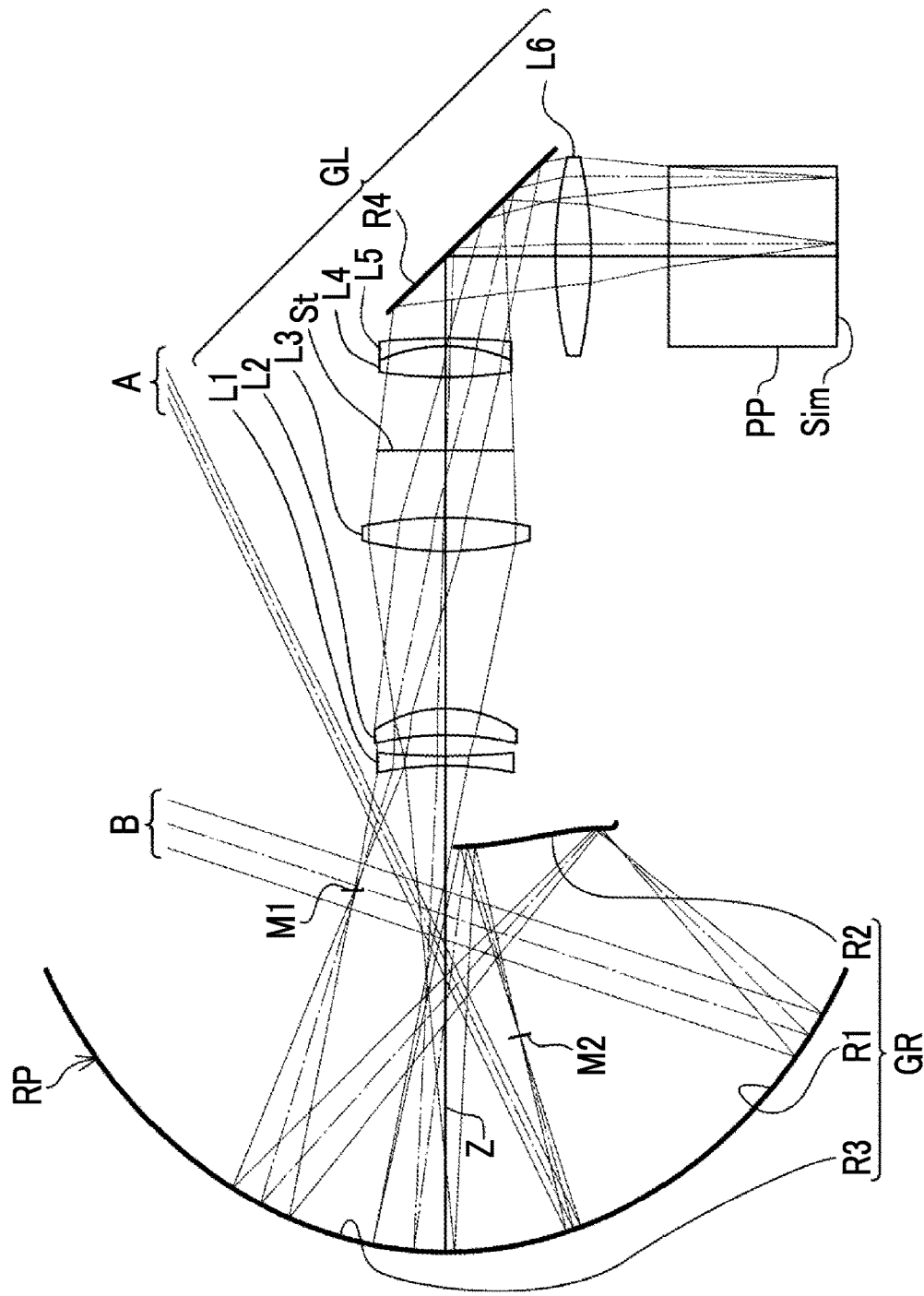
FIG. 10 is a cross-sectional view showing a configuration of an imaging optical system of Modification Example 4 of Example 4 of the present disclosure.

Similarly to Modification Example 1 shown in FIG. 6, the imaging optical system of Modification Example 4 of Example 4 shown in FIG. 10 is configured such that one reflective surface R4 is added in the dioptric system GL and the optical axis Z is deflected by 90° twice in the dioptric system GL. In Modification Example 4 shown in FIG. 10, placement of the reflective surface R4 is different from that in Modification Example 1 shown in FIG. 6. In FIG. 10, the reflective surface R4 is disposed at a position shifted by 17 mm (millimeters) to the magnification side from the vertex of the surface No. 14 on the magnification side of the lens L6.

Figure 18:
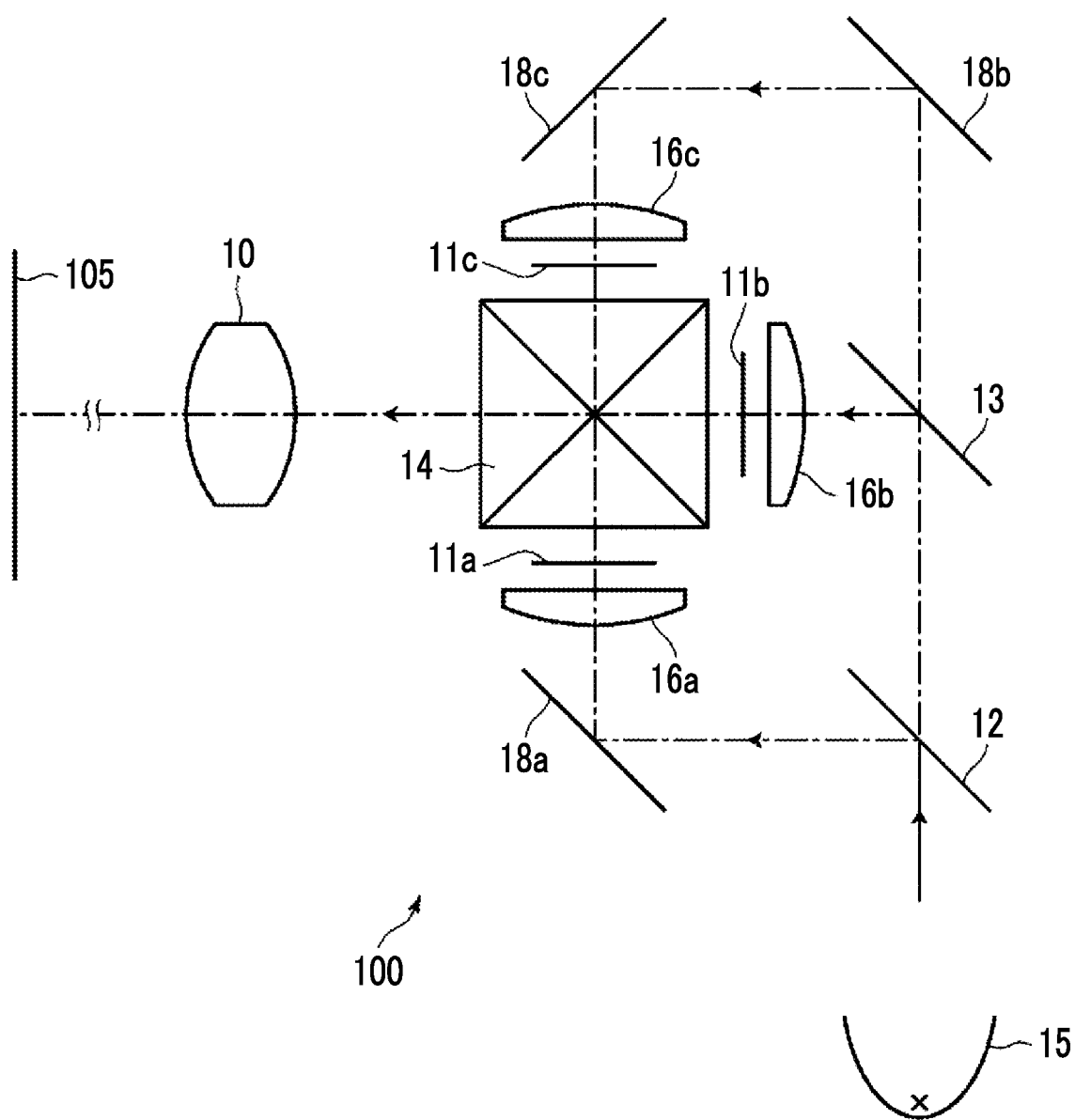
FIG. 18 is a schematic configuration diagram of a projection display device according to an embodiment of the present disclosure.

Next, a projection display device according to an embodiment of the present invention will be described. FIG. 18 is a schematic configuration diagram of the projection display device according to the embodiment of the present invention. The projection display device 100 shown in FIG. 18 has an imaging optical system 10 according to the embodiment of the present invention, a light source 15, transmissive display elements 11a to 11c as light valves corresponding to respective color light rays, dichroic mirrors 12 and 13 for color separation, a cross dichroic prism 14 for color synthesis, condenser lenses 16a to 16c, and total reflection mirrors 18a to 18c for deflecting the optical axis. In FIG. 18, the imaging optical system 10 is schematically shown. Further, an integrator is disposed between the light source 15 and the dichroic mirror 12 but not shown in FIG. 18.

White light originated from the light source 15 is separated into rays with three colors (G light, B light, R light) through the dichroic mirrors 12 and 13. Thereafter, the rays respectively pass through the condenser lenses 16a to 16c, are incident into and optically modulated through the transmissive display elements 11a to 11c respectively corresponding to the rays with the respective colors, are subjected to color synthesis through the cross dichroic prism 14, and are subsequently incident into the imaging optical system 10. The imaging optical system 10 projects an optical image, which is formed by the light optically modulated through the transmissive display elements 11a to 11c, onto a screen 105.

Figure 19:
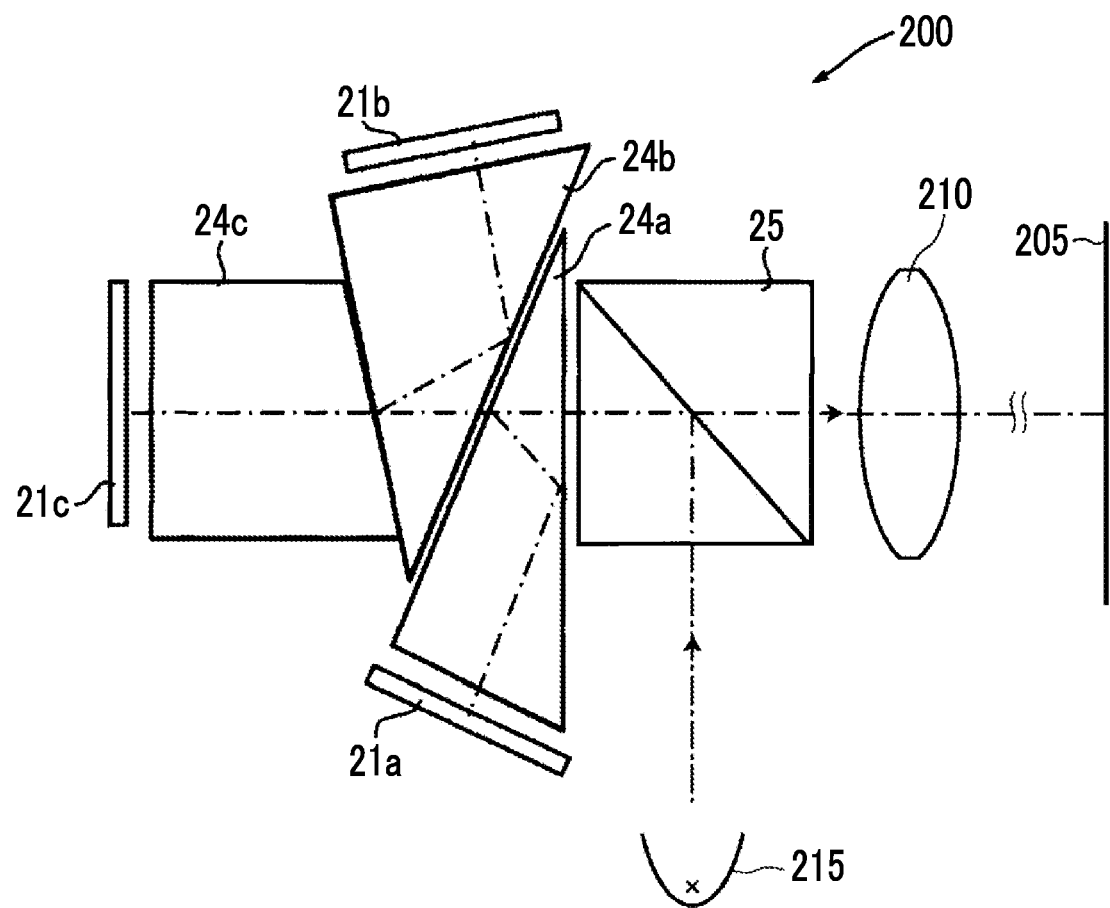
FIG. 19 is a schematic configuration diagram of a projection display device according to another embodiment of the present disclosure.
Figure 22:
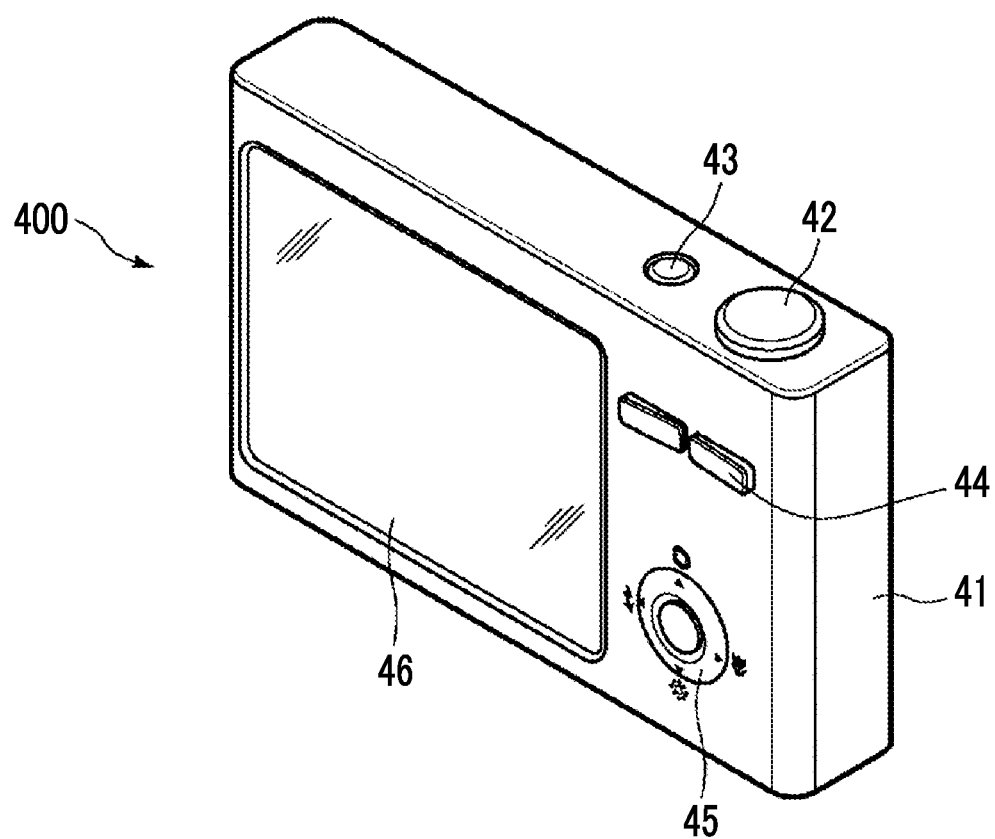
FIG. 22 is a perspective view of the rear side of the imaging apparatus shown in FIG. 21.

FIG. 19 is a schematic configuration diagram of a projection display device according to another embodiment of the present invention. The projection display device 200 shown in FIG. 19 has an imaging optical system 210 according to the embodiment of the present invention, a light source 215, DMD elements 21a to 21c as light valves corresponding to respective color light rays, total internal reflection (TIR) prisms 24a to 24c for color separation and color synthesis, and a polarization separating prism 25 that separates illumination light and projection light. In FIG. 22, the imaging optical system 210 is schematically illustrated. Further, an integrator is disposed between the light source 215 and the polarization separating prism 25, but illustration thereof is omitted in FIG. 19.

White light originated from the light source 215 is reflected on a reflective surface inside the polarization separating prism 25, and is separated into rays with three colors (G light, B light, R light) through the TIR prisms 24a to 24c. The separated rays with the respective colors are respectively incident into and optically modulated through the corresponding DMD elements 21a to 21c, travel through the TIR prisms 24a to 24c again in a reverse direction, are subjected to color synthesis, are subsequently transmitted through the polarization separating prism 25, and are incident into the imaging optical system 210. The imaging optical system 210 projects an optical image, which is formed by the light optically modulated through the DMD elements 21a to 21c, onto a screen 205.

Figure 20:
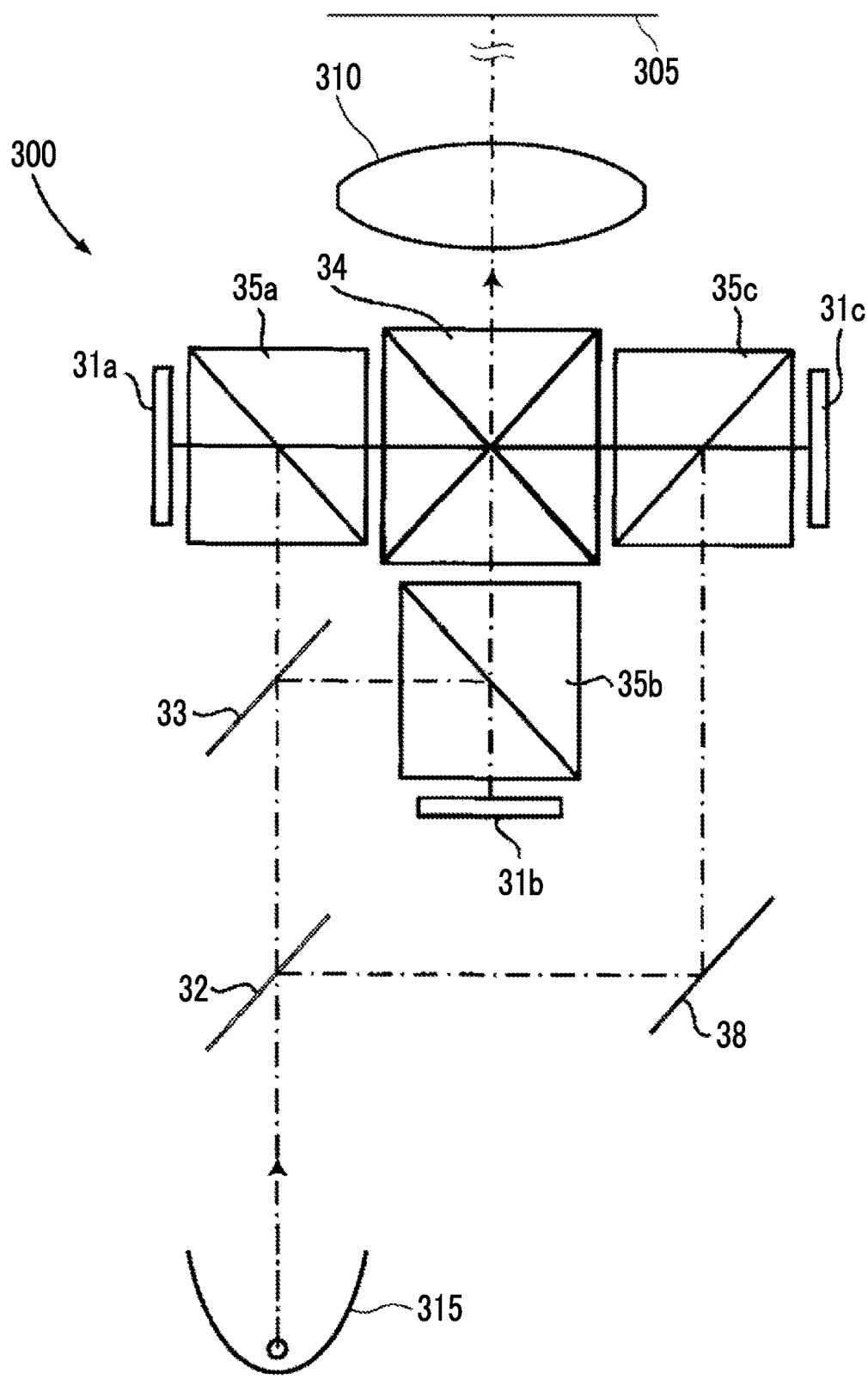
FIG. 20 is a schematic configuration diagram of a projection display device according to still another embodiment of the present disclosure.

FIG. 20 is a schematic configuration diagram of a projection display device according to still another embodiment of the present invention. The projection display device 300 shown in FIG. 20 has an imaging optical system 310 according to the embodiment of the present invention, a light source 315, reflective display elements 31a to 31c as light valves corresponding to respective color light rays, dichroic mirrors 32 and 33 for color separation, a cross dichroic prism 34 for color synthesis, a total reflection mirror 38 for deflecting the optical axis, and polarization separating prisms 35a to 35c. In FIG. 20, the imaging optical system 310 is schematically shown. Further, an integrator is disposed between the light source 315 and the dichroic mirror 32 but not shown in FIG. 20.

White light originated from the light source 315 is separated into rays with three colors (G light, B light, R light) through the dichroic mirrors 32 and 33. The separated rays with the respective colors respectively pass through the polarization separating prisms 35a to 35c, are incident into and optically modulated through the reflective display elements 31a to 31c respectively corresponding to the rays with the respective colors, are subjected to color synthesis through the cross dichroic prism 34, and are subsequently incident into the imaging optical system 310. The imaging optical system 310 projects an optical image, which is formed by the light optically modulated through the reflective display elements 31a to 31c, onto a screen 305.

Figure 21:
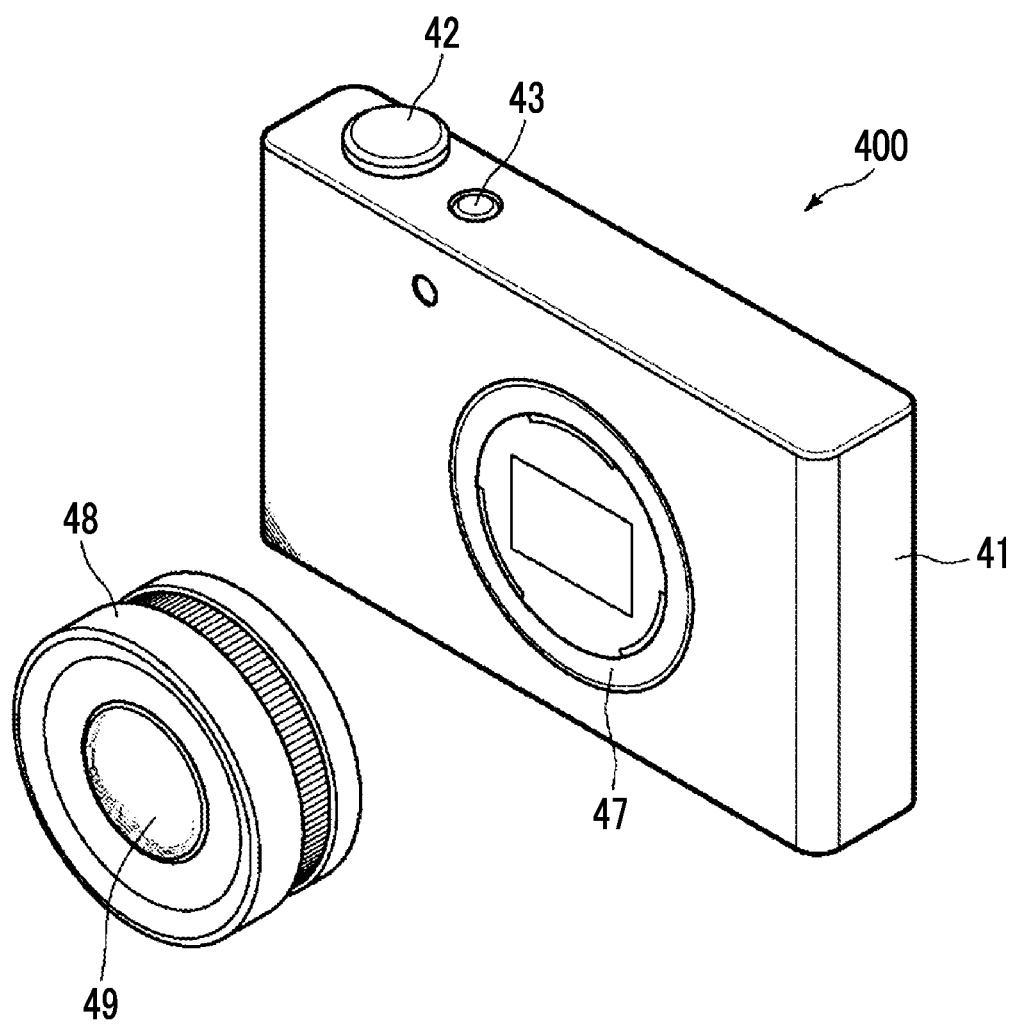
FIG. 21 is a perspective view of the front side of an imaging apparatus according to an embodiment of the present disclosure.

FIGS. 21 and 22 are external views of a camera 400 which is the imaging apparatus according to the embodiment of the present invention. FIG. 21 is a perspective view of the camera 400 viewed from the front side, and FIG. 22 is a perspective view of the camera 400 viewed from the rear side. The camera 400 is a single-lens digital camera on which an interchangeable lens 48 is detachably mounted and which has no reflex finder. The interchangeable lens 48 is configured such that an imaging optical system 49 as the optical system according to the embodiment of the present invention is housed in a lens barrel.

The camera 400 comprises a camera body 41, and a shutter button 42 and a power button 43 are provided on an upper surface of the camera body 41. Further, operation sections 44 and 45 and a display section 46 are provided on a rear surface of the camera body 41. The display section 46 is for displaying a captured image and/or an image within an angle of view before imaging.

An imaging aperture, through which light from an imaging target is incident, is provided at the center on the front surface of the camera body 41. A mount 47 is provided at a position corresponding to the imaging aperture. The interchangeable lens 48 is mounted on the camera body 41 with the mount 47 interposed therebetween.

In the camera body 41, there are provided an imaging element, a signal processing circuit, a storage medium, and the like. The imaging element (not shown in the drawing) such as a charge coupled device (CCD) or a complementary metal oxide semiconductor (CMOS) outputs a captured image signal based on a subject image which is formed through the interchangeable lens 48. The signal processing circuit generates an image through processing of the captured image signal which is output from the imaging element. The storage medium stores the generated image. The camera 400 is able to capture a still image or a moving image by pressing the shutter button 42, and is able to store image data, which is obtained through imaging, in the storage medium.

The present invention has been hitherto described through embodiments and examples, but the imaging optical system of the present invention is not limited to the above-mentioned embodiments and examples, and may be modified into various forms. For example, the radius of curvature, the surface distance, the refractive index, and the Abbe number of each lens may be appropriately changed.

In each of the above-mentioned examples, each surface shape of the first reflective surface R1, the third reflective surface R3, and the second reflective surface R2 has been described as examples of an aspheric shape or a free-form surface shape. However, at least one surface shape may be a spherical shape.

Further, the projection display device of the present invention is not limited to that of the above-mentioned configuration. For example, the used light valve and the optical member used in separation or synthesis of rays are not limited to those of the above-mentioned configuration, and may be modified into various forms.

The projection display device of the present invention is also not limited to the above-mentioned configuration, and various modifications of the optical member and the light valve used for the ray separation or the ray synthesis, for example, can be made. The light valve is not limited to a configuration in which light from a light source is spatially modulated by an image display element and output as an optical image based on image data, and may be configured to output light itself, which is output from a self-luminous image display element, as an optical image based on image data. Examples of the self-luminous image display element include an image display element in which light-emitting elements such as light emitting diodes (LED) or organic light emitting diodes (OLED) are two-dimensionally arranged.

Further, the imaging apparatus of the present invention is also not limited to the above-mentioned configurations. For example, the present invention may be applied to a single-lens reflex camera, a film camera, a video camera, and the like.

What is claimed is:

1. An imaging optical system consisting of, in order from a magnification side:
   a catoptric system; and
   a dioptric system that includes a plurality of lenses,
   wherein the dioptric system forms a first intermediate image between the dioptric system and the catoptric system on an optical path and at a position conjugate to a reduction side imaging surface, and the catoptric system re-forms the first intermediate image on a magnification side imaging surface,
   wherein the catoptric system consists of a first reflective surface, a second reflective surface, and a third reflective surface in order along the optical path from the magnification side,
   wherein the first reflective surface and the third reflective surface are formed on one member and have same surface shapes,
   wherein the first reflective surface and the third reflective surface are same aspheric surfaces or same free-form surfaces, and
   wherein the same aspheric surface or the same free-form surface means that the expression and all coefficients defining the aspheric surface or the free-form surface are the same.

2. The imaging optical system according to claim 1, wherein the first reflective surface and the third reflective surface have concave surface shapes.

3. The imaging optical system according to claim 1, wherein a second intermediate image is formed between the first reflective surface and the second reflective surface on the optical path and at a position conjugate to the first intermediate image.

4. The imaging optical system according to claim 3, wherein principal rays, which have a maximum angle of view and travel from the first reflective surface toward the magnification side, intersect twice with principal rays, which have the maximum angle of view, in the catoptric system.

5. The imaging optical system according to claim 2, wherein the second reflective surface has a convex surface shape.

6. The imaging optical system according to claim 1, wherein all optical surfaces of the dioptric system are formed as rotationally symmetric surfaces which are rotationally symmetric with respect to an optical axis of the dioptric system as a center.

7. The imaging optical system according to claim 1, wherein at least one of the first reflective surface, the second reflective surface, or the third reflective surface and a part of the dioptric system move during focusing.

8. The imaging optical system according to claim 1, wherein a reflective surface closest to the dioptric system among the first reflective surface, the second reflective surface, and
   the third reflective surface and a part of the dioptric system move during focusing.

9. A projection display device comprising:
   a light valve that outputs an optical image based on image data; and
   the imaging optical system according to claim 1,
   wherein the imaging optical system projects the optical image, which is output from the light valve, on a screen.

10. An imaging apparatus comprising the imaging optical system according to claim 1.

11. The imaging optical system according to claim 1, wherein the first intermediate image is formed between a lens surface closest to the magnification side of the dioptric system and the third reflective surface on an optical path.

* * * * *